(12) United States Patent
Flores Chaparro et al.

(10) Patent No.: US 11,953,745 B2
(45) Date of Patent: Apr. 9, 2024

(54) FIBER OPTIC CABLE TRANSITION TUBE

(71) Applicant: CommScope Technologies LLC, Hickory, NC (US)

(72) Inventors: Karla M. Flores Chaparro, Chihuahua (MX); Alejandro Jose Avila Davila, Chihuahua (MX); Jesus Gustavo Pureco Chico, Chihuahua (MX)

(73) Assignee: Commscope Technologies LLC, Hickory, NC (US)

( * ) Notice: Subject to any disclaimer, the term of this patent is extended or adjusted under 35 U.S.C. 154(b) by 0 days.

(21) Appl. No.: 17/707,195

(22) Filed: Mar. 29, 2022

(65) Prior Publication Data

US 2022/0308300 A1 Sep. 29, 2022

Related U.S. Application Data

(60) Provisional application No. 63/167,493, filed on Mar. 29, 2021.

(51) Int. Cl.
*G02B 6/44* (2006.01)
*G02B 6/38* (2006.01)

(52) U.S. Cl.
CPC .......... *G02B 6/443* (2013.01); *G02B 6/3849* (2013.01); *G02B 6/4431* (2023.05); *G02B 6/4471* (2013.01); *G02B 6/4486* (2013.01)

(58) Field of Classification Search
CPC ............................. G02B 6/4471; G02B 6/3849
See application file for complete search history.

(56) References Cited

U.S. PATENT DOCUMENTS

| | | | | |
|---|---|---|---|---|
| 6,438,299 | B1* | 8/2002 | Brown | G02B 6/4471 385/100 |
| 7,769,261 | B2* | 8/2010 | Lu | G02B 6/4475 385/100 |
| 9,618,718 | B2* | 4/2017 | Islam | G02B 6/4416 |
| 10,545,308 | B2 | 1/2020 | Fahd et al. | |
| 10,649,165 | B2 | 5/2020 | Pausan et al. | |
| 11,262,520 | B2 | 3/2022 | Geens et al. | |
| 2002/0129623 | A1* | 9/2002 | Nonomura | G02B 6/3843 385/100 |
| 2005/0276551 | A1* | 12/2005 | Brown | G02B 6/4472 385/100 |
| 2014/0126873 | A1* | 5/2014 | Cooke | G02B 6/4471 385/139 |
| 2014/0140664 | A1* | 5/2014 | Islam | G02B 6/4471 385/86 |
| 2018/0299631 | A1* | 10/2018 | Pausan | G02B 6/4495 |

FOREIGN PATENT DOCUMENTS

| | | |
|---|---|---|
| WO | 2012007904 A1 | 1/2012 |
| WO | 2012007905 A1 | 1/2012 |

* cited by examiner

*Primary Examiner* — Charlie Y Peng
(74) *Attorney, Agent, or Firm* — Merchant & Gould P.C.

(57) ABSTRACT

A transition tube is provided for receipt of a fiber optic cable with a jacket portion and a stripped fiber portion. The transition tube allows the optical fiber to be placed within a gel block seal so that the gel block need not contact the jacket of the optical fiber cable. In some examples, the transition tube contains inner geometry to allow easy insertion of an optical fiber cable. In other examples, an end of the cable is sealed within the transition tube.

10 Claims, 29 Drawing Sheets

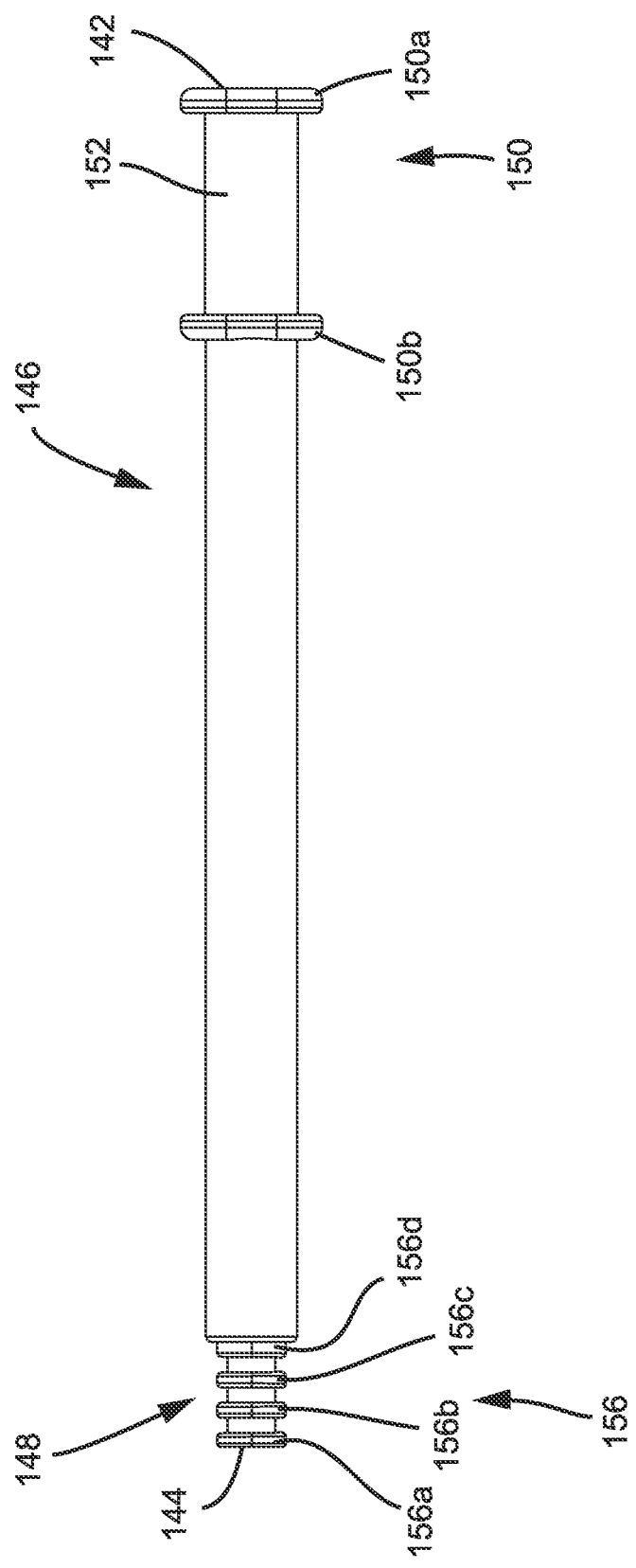

FIBER OPTIC CABLE TRANSITION TUBE

CROSS-REFERENCE TO RELATED APPLICATION

This application is being filed on Mar. 29, 2022 and claims the benefit of U.S. patent Application Ser. No. 63/167,493, filed on Mar. 29, 2021, the disclosure of which is incorporated herein by reference in its entirety.

BACKGROUND

A typical fiber optic cable includes an outer cable jacket containing one or more optical fibers and one or more strength elements for reinforcing the cable. Some cable jackets include irregular features along their lengths (e.g., notches) to provide for easy removal and tearing of the jacket to allow access to the internal optical fibers. In some applications, fiber optic cables are routed into enclosure through sealing blocks (e.g., gel blocks) which seal about the cables to prevent moisture from entering the enclosures. It has been determined that certain surface irregularities in the outer surfaces of cable jackets can be difficult to seal with sealing blocks.

SUMMARY

The present disclosure relates to a fiber optic cable transition tube which provides a contact surface adapted to contact a sealing structure such as a gel block seal used in a fiber optic enclosure. The contact surface is configured to provide effective sealing between the sealing structure and the fiber optic cable transition tube. In certain examples, the fiber optic cable transition tube is mounted at the end of a fiber optic cable and the contact surface provides an intermediate sealing surface against which the sealing structure can seal thereby eliminating the need for the sealing structure to directly seal against a cable jacket of the fiber optic cable. In this way, the cable transition tube can compensate for incompatibilities (e.g., mechanical or chemical) between the cable jacket and the gel block. In certain examples, the end of the cable is sealed within the fiber optic cable transition tube by adhesive such as epoxy.

One aspect of the present disclosure relates to a fiber optic cable assembly. In this embodiment, the fiber optic cable assembly comprises a fiber optic cable including a cable jacket and at least one optical fiber protected by the cable jacket. The cable jacket defines at least one access notch that extends along a length of the cable jacket for facilitating tearing the cable jacket to access the optical fiber. The cable jacket also includes a jacket end portion and the optical fiber including a fiber end portion that projects beyond the jacket end portion. The fiber optic cable assembly further comprises a transition tube having a length that extends between first and second ends of the transition tube. The transition tube defines a passage that extends through the length of the transition tube between the first and second ends of the transition tube. The cable jacket extends into the passage of the transition tube through the first end of the transition tube. The jacket end portion of the fiber optic cable is adhesively bonded and sealed within the passage of the transition tube, and the fiber end portion exits the transition tube at the second end of the transition tube.

BRIEF DESCRIPTION OF THE DRAWINGS

The accompanying drawings, which are incorporated in and constitute a part of the description, illustrate several aspects of the present disclosure. A brief description of the drawings is as follows:

FIG. 10 is a bottom view of the transition tube of FIG. 5.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
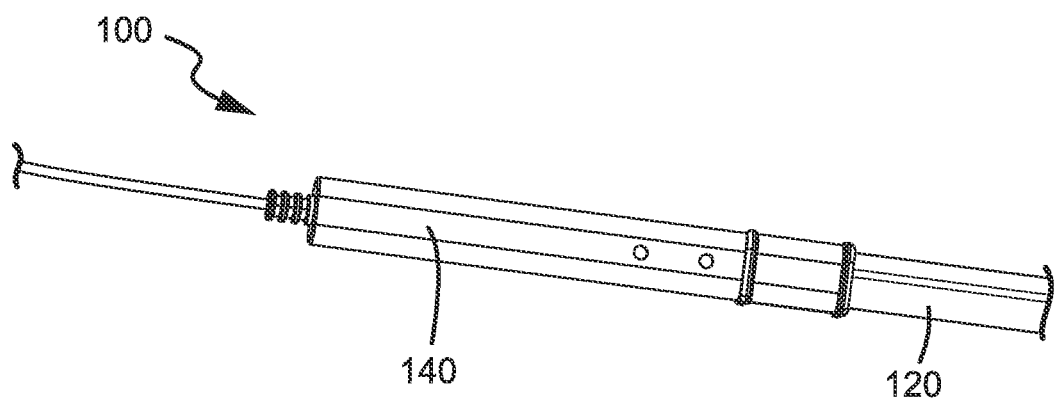
FIG. 1 is a side view of an example fiber optic cable assembly.

FIG. 1 depicts a side view of an example fiber optic cable assembly 100 of the present invention. The fiber optic cable assembly 100 of FIG. 1 includes a fiber optic cable 120 and a transition tube 140. The fiber optic cable 120 is inserted through a passage 158 (see FIG. 13) within the transition tube 140 so that a portion of the fiber optic cable 120 extends all the way through the passage 158.

Figure 2:
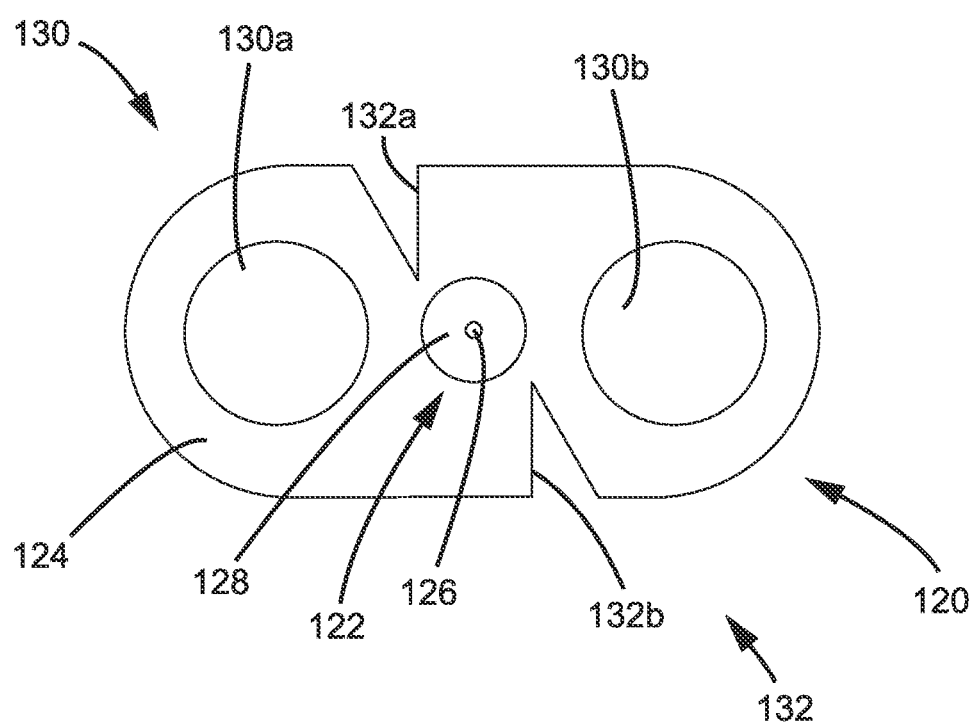
FIG. 2 is a transverse cross-sectional view of an optical fiber cable.

FIG. 2 is a cross sectional view of the fiber optic cable 120. The fiber optic cable 120 includes a buffered optical fiber 122 and a cable jacket 124. In some embodiments, the buffered optical fiber 122 further includes an optical fiber 126 and a buffer layer 128. In some embodiments, the fiber optic cable 120 includes one or more strength members 130 (e.g., glass reinforced polymer rods) within the cable jacket 124. In other examples, strength members such as Aramid yarn can be used.

In some embodiments, the optical fiber 126 has a diameter of approximately 250 microns in some examples or approximately 200 microns in other examples. The optical fiber 126 can include a glass core surrounded by a glass cladding layer. The cladding layer has a lower index of refraction as compared to the core to facilitate the transmission of light through the core via total internal reflection. The optical fiber 126 also preferably includes a polymeric coating layer (e.g., acrylate) which surrounds the cladding layer. The buffer layer 128 surrounds the coating layer and in one example has an outer diameter of about 900 microns.

The buffer layer 128 surrounds and encapsulates the optical fiber 126 to provide mechanical isolation, protection from physical damage, and/or fiber identification. In some embodiments, the buffer layer 128 is a polymer coating. Typically, the buffer layer 128 extends along the length of the optical fiber 126 and is placed in intimate contact with the coating material. In some embodiments, the buffer layer 128 has a diameter of approximately 800-1000 microns.

The cable jacket 124 surrounds the buffer layer 128 and provides further environmental protection to the buffered optical fiber 122. For example, the cable jacket 124 may provide protection against moisture, weather, temperature, fire, oil, or corrosive conditions. The cable jacket 124 extends along all or a portion of the length of the buffered optical fiber 122. The jacket material may be, for example, a polyethylene, polyvinyl chloride, polyvinyl difluoride, or low smoke zero halogen material. The jacket material is flexible as to allow for the optical fiber 122 to be routed according to the needs of the user.

In some embodiments, the cable jacket 124 may further include one or more strength members 130. The strength members 130 extend along the length of the cable jacket 124 and are generally encapsulated within the cable jacket 124 material. The strength members 130 provide support as to preserve the integrity of the fiber optic cable 120. The strength members 130, for example, prevent the fiber optic cable 120 from being bent at a bending radius that could damage the optical fiber 122. The strength members 130 also increase the tensile strength of the fiber optic cable 120. In some embodiments, the strength members 130 are fiberglass rods, Kevlar yarn, or copper wire, each of which may be used with or without an epoxy material.

In some embodiments, the cable jacket 124 also includes one or more notches 132 that extend along its length. These notches 132 allow for a user to easily peel apart the cable jacket 124 and access the optical fiber 122. In the example of FIG. 2, the notches 132 terminate sharply as to facilitate easy tearing and peeling of the cable jacket 124.

Figure 3:
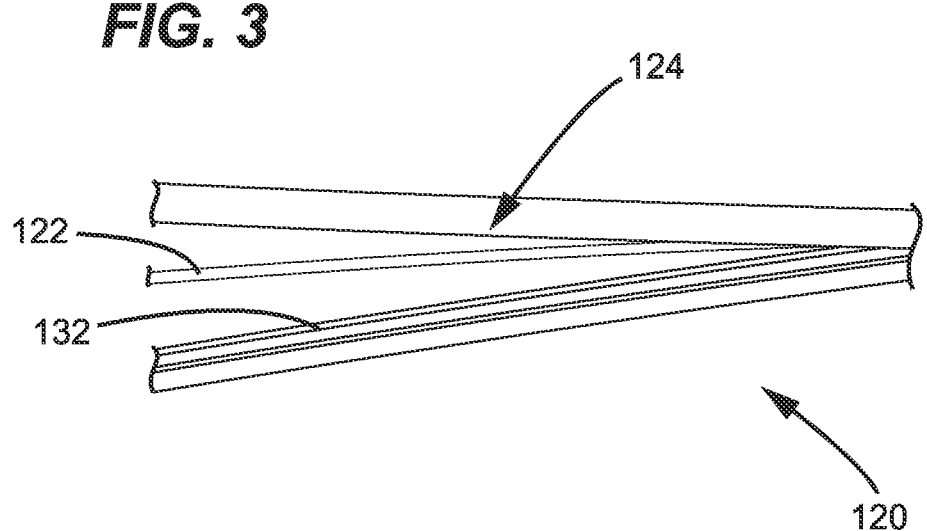
FIG. 3 is a side view of an example optical fiber protruding from a peeled cable jacket.
Figure 4:
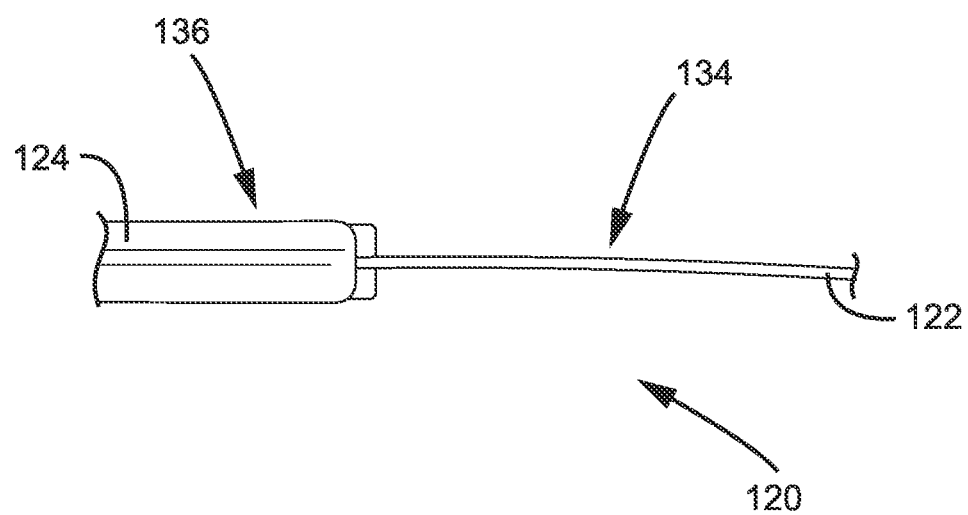
FIG. 4 is a side view of the example optical fiber of FIG. 3 protruding from the end of a stripped cable jacket.
Figure 5:
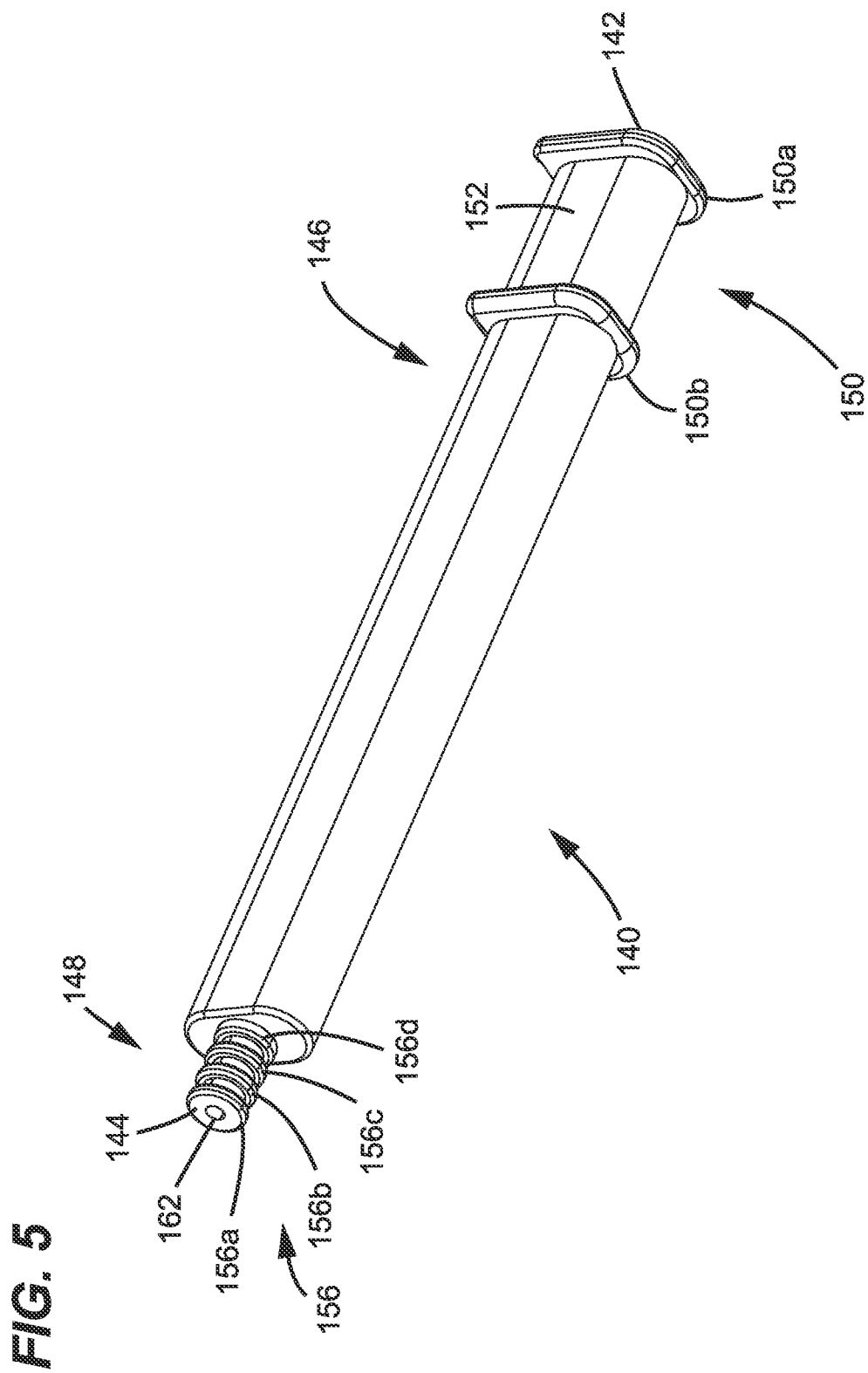
FIG. 5 is a perspective view of an example optical fiber transition tube.
Figure 6:
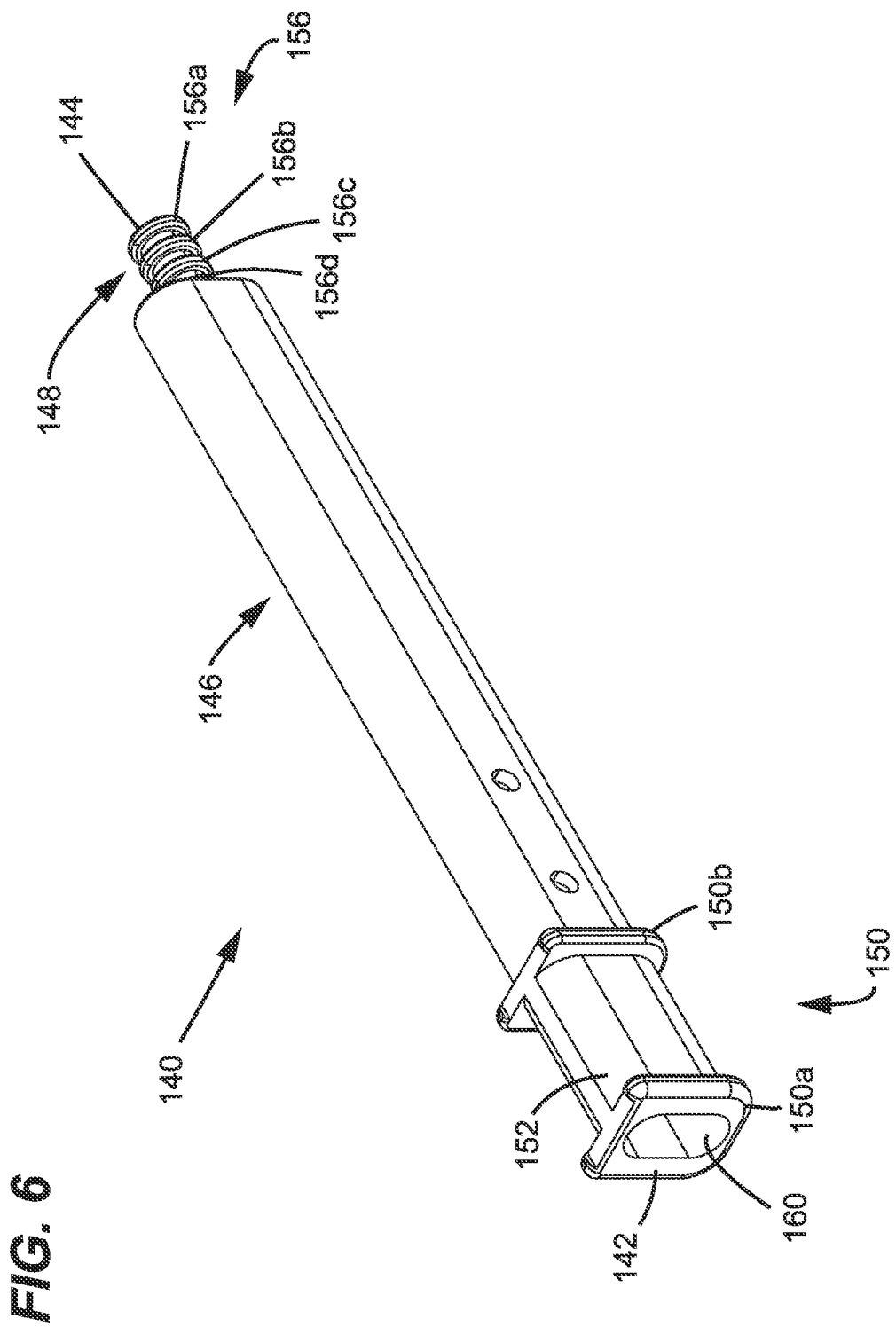
FIG. 6 is another perspective view of the transition tube of FIG. 5.

In FIG. 3, the fiber optic cable 120 is shown with the cable jacket 124 peeled along the notches 132 away from the optical fiber 122. Thus, the jacket 124 is stripped from the optical fiber 122 so that the user can configure the optical fiber 122 to be attached to a connector or for optical splicing. Hereinafter, the portion of the fiber optic cable 120 that includes the cable jacket 124 is referred to as the jacket end portion 136 and the exposed portion of the optical fiber 122 that does not include the cable jacket 124 is referred to as the fiber end portion 134. Turning to FIG. 4, the fiber optic cable 120 is shown with the peeled cable jacket 124 cut away so that an optical fiber end portion 134 is shown protruding from a clean jacket end portion 136 of the fiber optic cable 120.

FIGS. 5-10 depict alternative views of an example optical fiber transition tube 140. The transition tube 140 is elongated so that it includes a first end 142 and a second end 144. In some embodiments, the transition tube 140 has a length of approximately 47.50 millimeters (1.87 inches) between its first end 142 and second end 144. In the example embodiments of FIGS. 5-10, the transition tube 140 includes distinct first and second sections 146, 148. The first section 146 is adjacent to the first end 142 of the transition tube 140 and has an outer surface shaped with an elongate transverse cross-sectional shape/profile (e.g., racetrack shaped, elliptical, etc.). In other example, the profile can be circular. In the embodiment of FIGS. 5-10, the first section 146 extends a majority of the length of the transition tube 140. The second section 148 is adjacent to the second end 144 of the transition tube 140. The second section 148 has a cylindrical outer surface with a circular outer cross-sectional shape/profile. Like the first section 146, the cross-sectional shape of the second section 148 may vary in different embodiments. The outer diameter of the second section 148 is generally smaller than a major dimension of the outer cross-sectional shape of the first section 146. In some embodiments, the outer diameter of the second section 148 is also smaller than a minor dimension of the outer cross-sectional shape of the first section 146.

Figure 9:
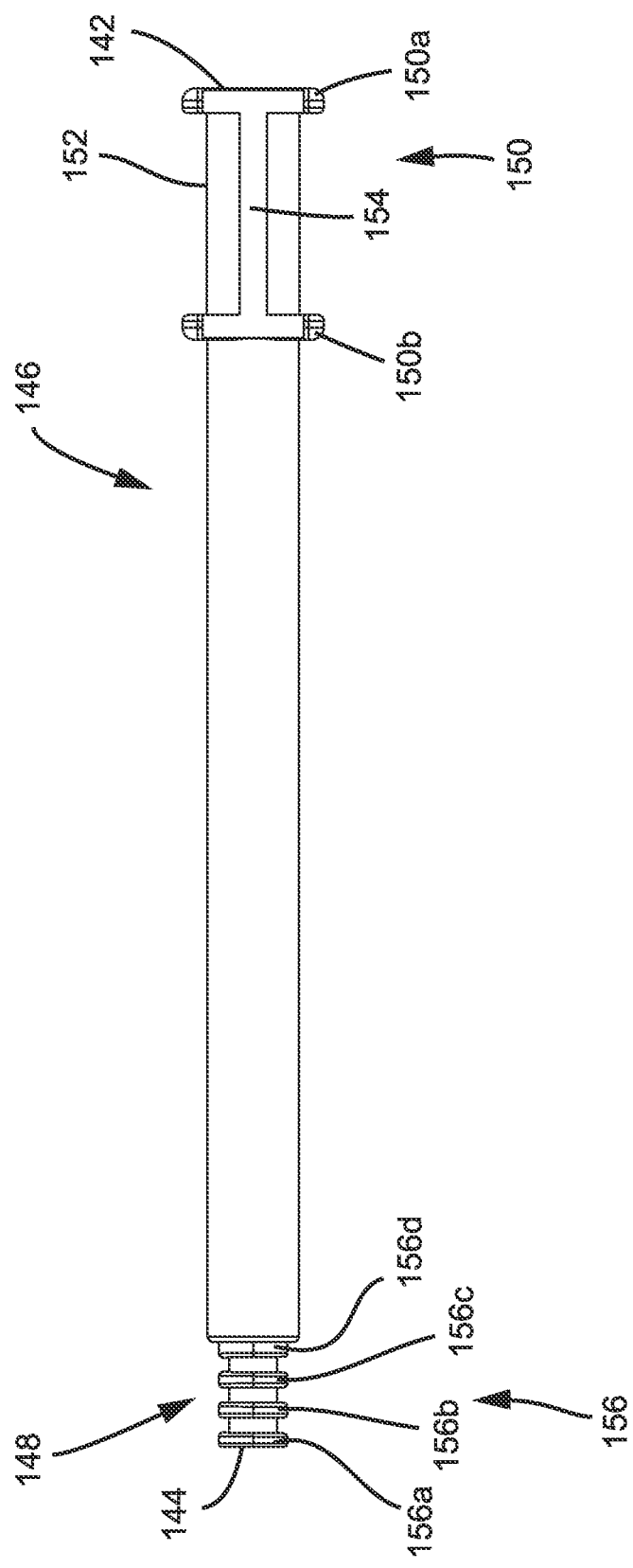
FIG. 9 is a top view of the transition tube of FIG. 5.

In some embodiments, the transition tube 140 includes one or more flanges 150 on its outer surface. In the examples of FIGS. 5-10, a first flange 150a and a second flange 150b are included on the first section 146 of the transition tube 140. The first flange 150a is adjacent to the first end 142, and the second flange 150b is spaced approximately 10 millimeters (0.39 inches) away from the first flange 150a, although other spacings can be used as well. The transition tube 140 also has a connecting space 152 on the body of the first section 146 between the first flange 150a and second flange 150b. In some embodiments, as depicted in FIG. 9, the flanges 150 are connected on the top side of the transition tube 140 by a connecting flange 154, extending along the length of the transition tube 140 between the first flange 150a and the second flange 150b. In some embodiments, as depicted in FIG. 10, there remains at least one side of the transition tube 140 that does not contain a connecting flange 154 extending between the first flange 150a and second flange 150b.

Additionally, in some embodiments, the outer surface of the transition tube 140 includes one or more annular exterior ribs 156. In the example of FIGS. 5-10, four annular exterior ribs 156 are included on the second section 148 of the transition tube 140. The first annular rib 156a is positioned adjacent to the second end 144, while two additional annular ribs 156b, 156c are spaced equally apart along the length of the second section 148. A fourth annular exterior rib 156d is positioned adjacent to where the second section 148 connects to the first section 146 of the transition tube 140. The ribs 156 can be used to assist in retaining a flexible strain relief boot which can be fitted over the second section 148 and retained via friction or vial an interlock with the ribs 156.

Figure 12:
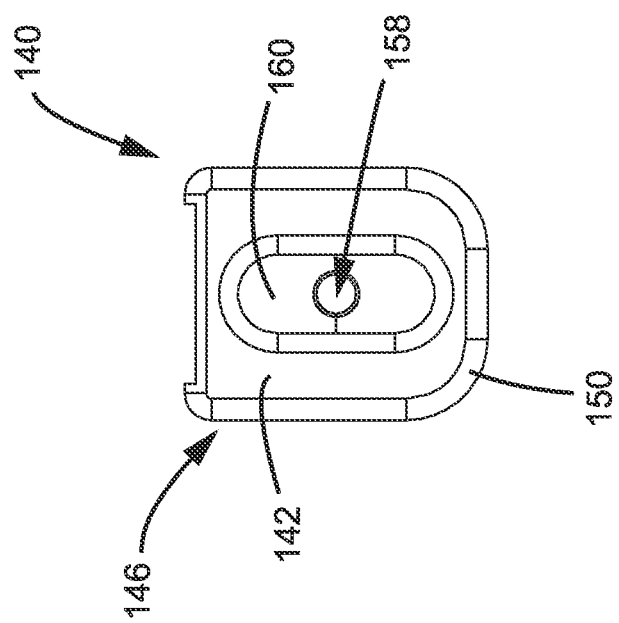
FIG. 12 is a rear view of the transition tube of FIG. 5.
Figure 11:
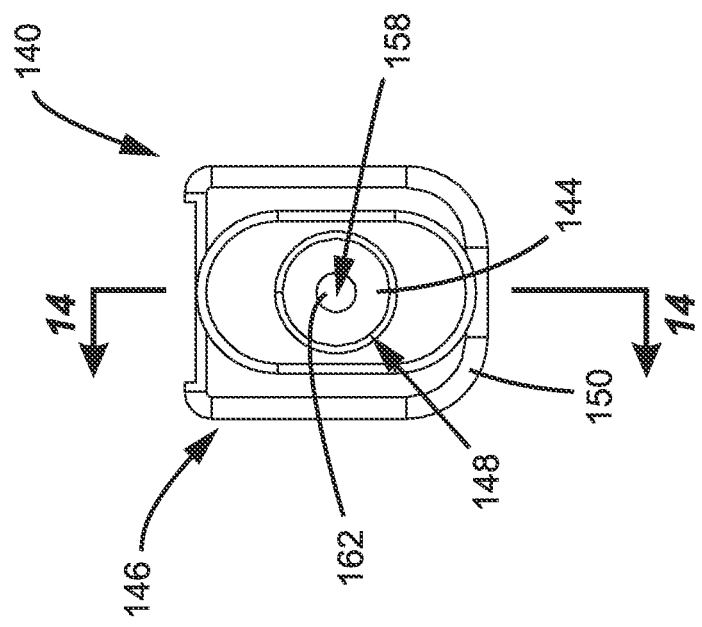
FIG. 11 is a front view of the transition tube of FIG. 5.

The transition tube 140 also has a first opening 160 on the first end 142 and a hollow passage 158 extending through its interior to a second opening 162 on the second end 144. In some embodiments, the hollow passage 158 changes in size along the length of the transition tube 140. In FIG. 11, a front of the example transition tube 140 of FIGS. 5-10 is shown. In FIG. 12, and rear view of the example transition tube 140 of FIGS. 5-10 is shown. As depicted in FIGS. 11-12, the passage 158 extends all the way through the length of the transition tube 140.

Figure 13:
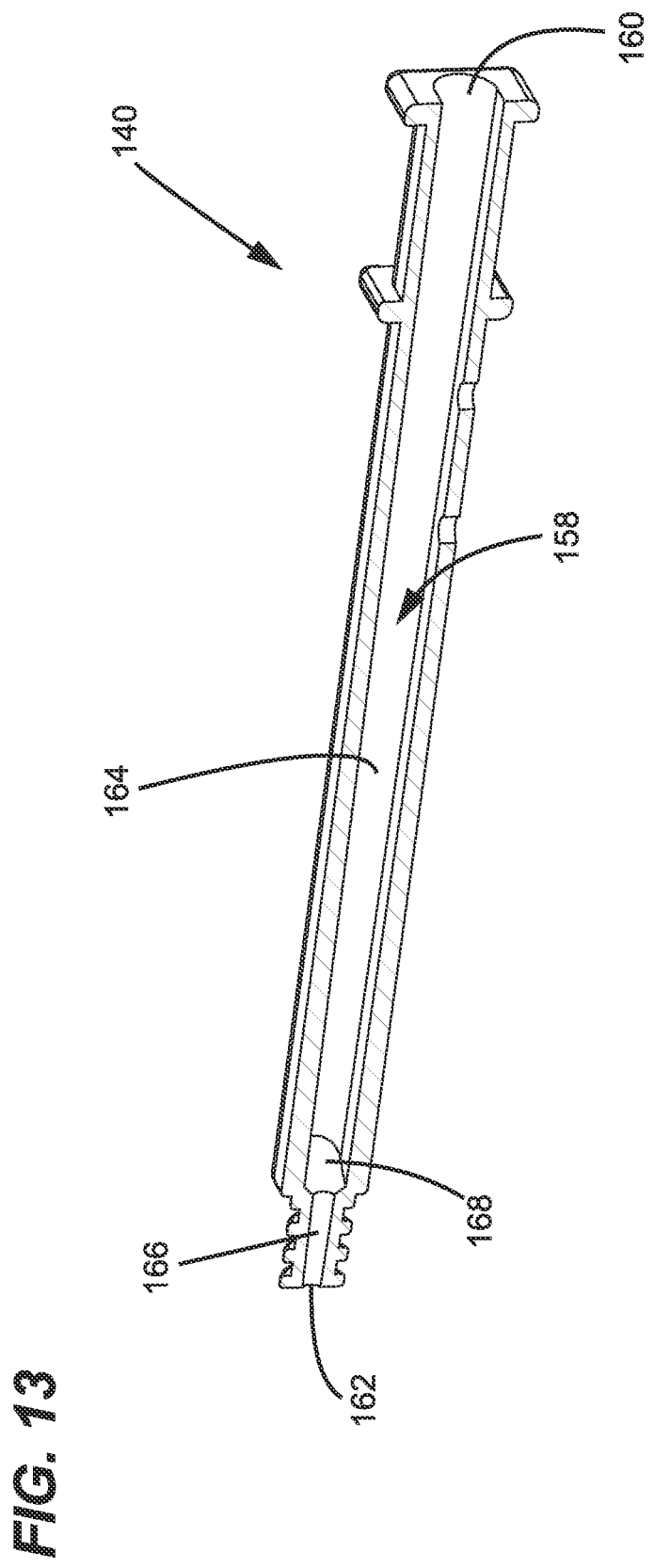
FIG. 13 is a perspective longitudinal section view of the transition tube of FIG. 5.
Figure 14:
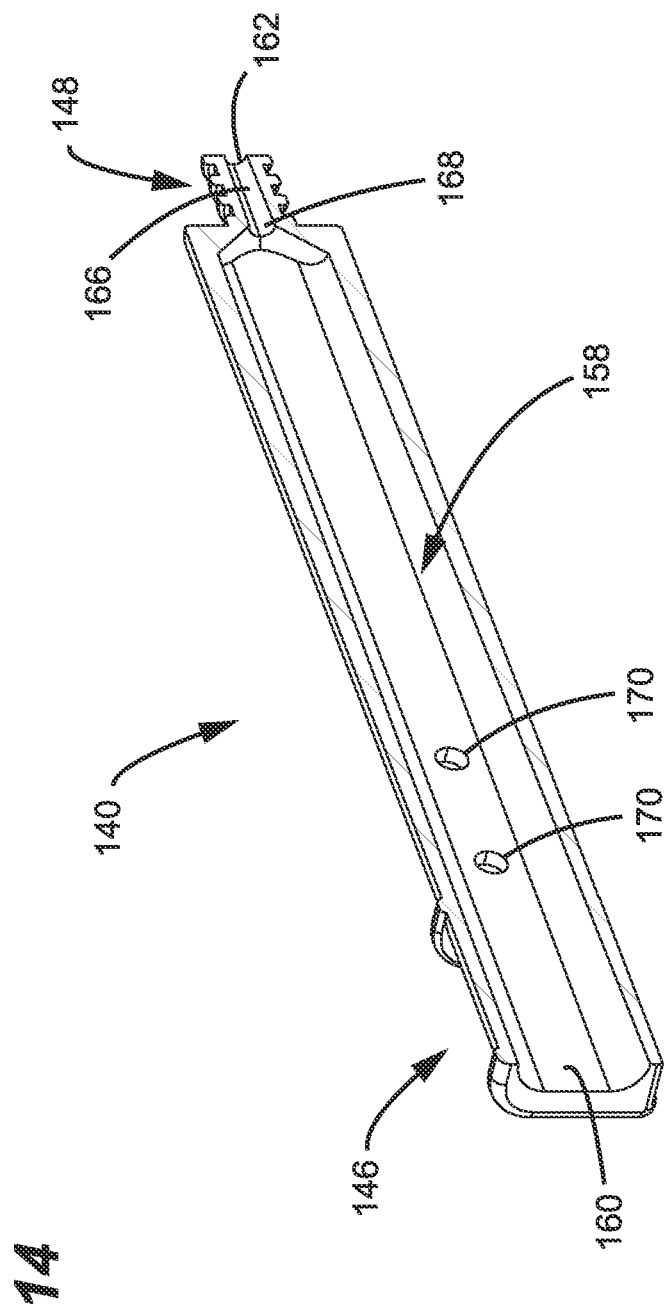
FIG. 14 is another perspective longitudinal section view of the transition tube of FIG. 5.

Turning to FIGS. 13 and 14, a section view of the transition tube 140 shows the hollow passage 158 extending completely through a length of the transition tube 140. In the example of FIGS. 13 and 14, the passage 158 comprises a first section passage 164, located within the interior of the first section 146, and a second section passage 166, located within the interior of the second section 148. In this example, the size of the first section passage 164 is larger in terms of its cross-sectional area than the second section passage 166. The cross-sectional area of the first section passage 164 is consistent throughout the length of the first section 146. In some embodiments, the cross-sectional area shape of the first section is elongate (e.g., racetrack shaped), however, this shape may vary and could be, for example, elliptical, rectangular, circular, or any other shape. Likewise, the cross-sectional area of the second section passage 166 is consistent throughout the length of the second section 148. Like the first section passage 164, the second section passage 166 cross sectional area shape may vary. In some embodiments, the cross-sectional area shape of the second section passage 166 is circular. Thus, the first opening 160 of the transition tube 140 is an elongate shape (e.g., racetrack) and the second opening 162 of the transition tube 140 is a circular shape.

In the example of FIGS. 13 and 14, the first section passage 164 continues through the length of the transition tube 140 from the first opening 160 to a first section passage end 168. The first section passage end 168 is located, for example, at the intersection of the first section 146 and second section 148 of the transition tube 140. In the example of FIGS. 13 and 14, the first section passage end 168 is a wall parallel with the first opening 160. The second section passage 166 is then formed through the wall of the first section passage end 168 to the second opening 162. Thus, when moving along the length of the transition tube 140 from the first opening 160 to the second opening 162, the cross-sectional area of the passage 158 is defined by the elongate cross sectional area of the first section passage 164 through the length of the first section 146. At the first section passage end 168, the cross-sectional area of the passage 158 sharply decreases. When moving from the first opening 160 to the second opening 162, the passage 158 is then is defined by the smaller circular cross-sectional area of the second section passage 166 through the length of the second section 148.

Figure 15:
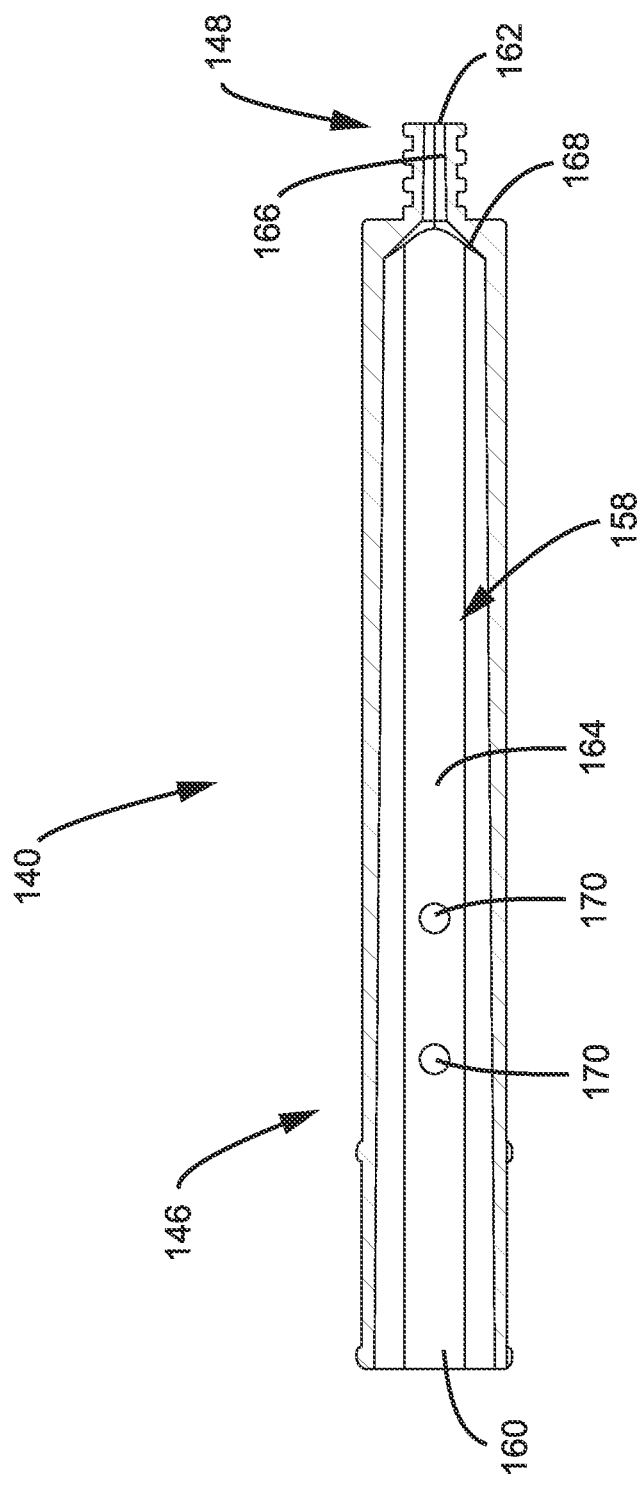
FIG. 15 is a perspective longitudinal section view of an alternative example embodiment of the transition tube.

In the example of FIG. 15, the first section passage end 168 differs from the first section passage end 168 illustrated in FIGS. 13 and 14 in that rather than abruptly decreasing in cross sectional area, the cross sectional area of the first section passage 164 gradually decreases along the path from the first opening 160 to the second opening 162. The cross sectional area of the first section passage 164 continues to decrease along the length of the transition tube 140 until it reaches the first section passage end 168, at which point the cross sectional area of the first section passage 164 is equal to the cross sectional area of the second section passage 166. The first section passage 164 and second section passage 166 connect at the first section passage end 168 as to form a continuous passage 158 throughout the length of the transition tube 140. Fiber guide surfaces adjacent the passage end 168 form a tapered guide structure (e.g., a funnel) for guiding the buffered fiber 22 from the first section passage 164 to the second section passage 166 when the buffered fiber 22 is inserted into the transition tube 140.

Figure 7:
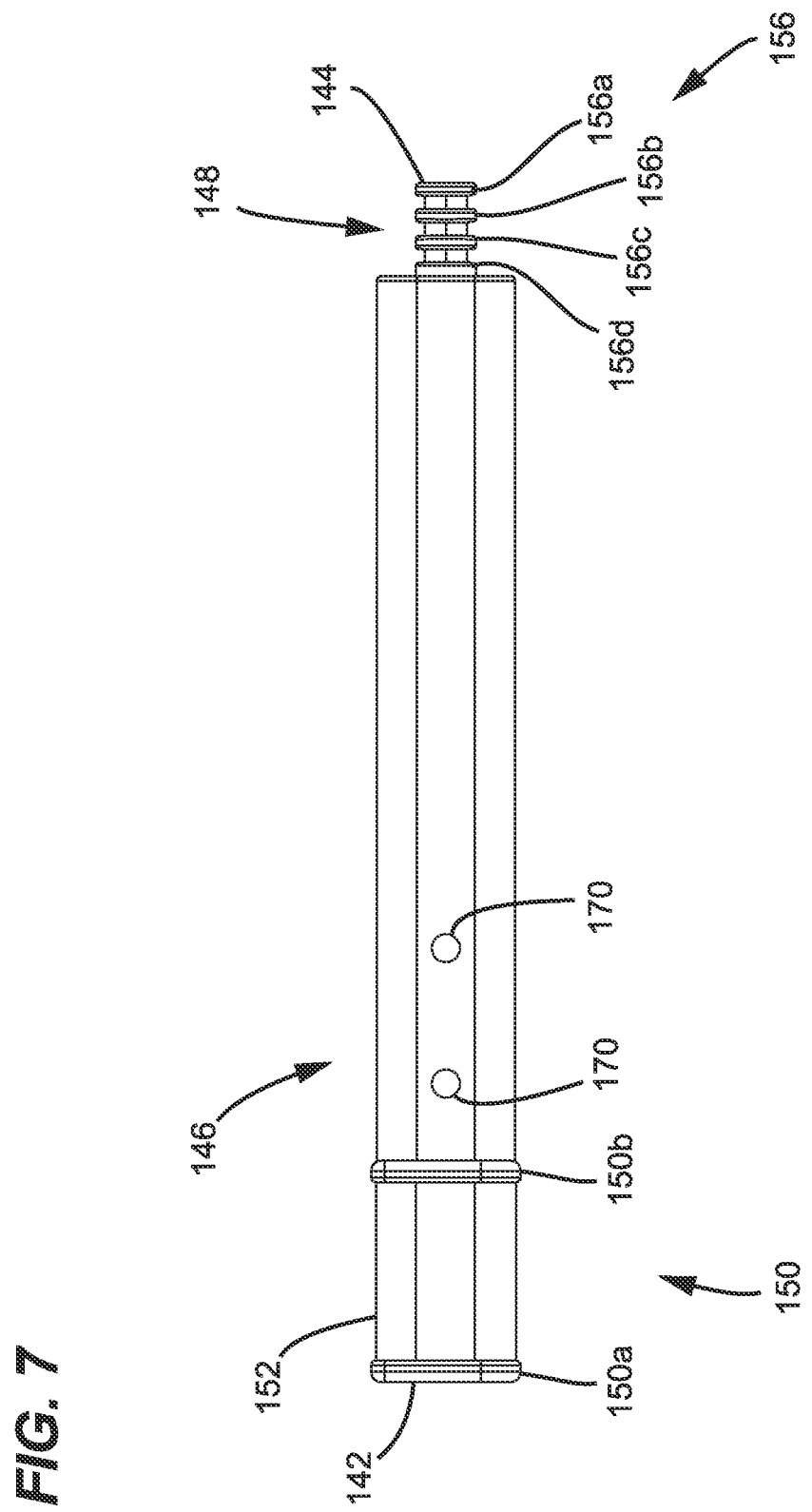
FIG. 7 is a side view of the transition tube of FIG. 5.
Figure 8:
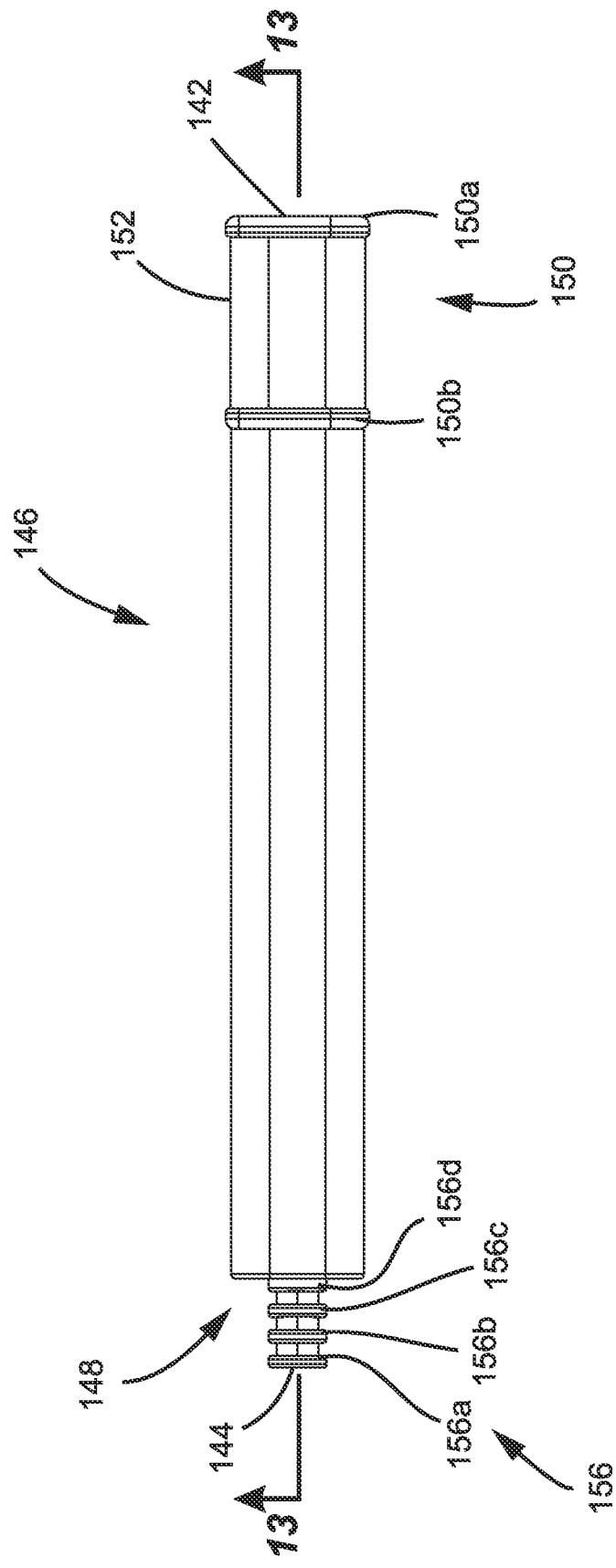
FIG. 8 is another side view of the transition tube of FIG. 5.

In some embodiments, one or more adhesive injection ports 170 are positioned along the length of the transition tube 140. Example adhesive injection ports 170 are depicted in FIGS. 7, 14, and 15. The adhesive injection ports 170 are configured to pass through at least one side of the transition tube 140 into the hollow passage 158 within the transition tube 140. Thus, the adhesive injection ports 170 allow access into the interior of the transition tube 140 from the exterior of the transition tube 140. In some embodiments, as seen in FIGS. 7, 14, and 15, two adhesive injection ports 170 are positioned side-by-side along the length of the transition tube 140. In the examples of FIGS. 7, 14, and 15, both adhesive injection ports 170 are located on the first section 146 of the transition tube 140.

Figure 16:
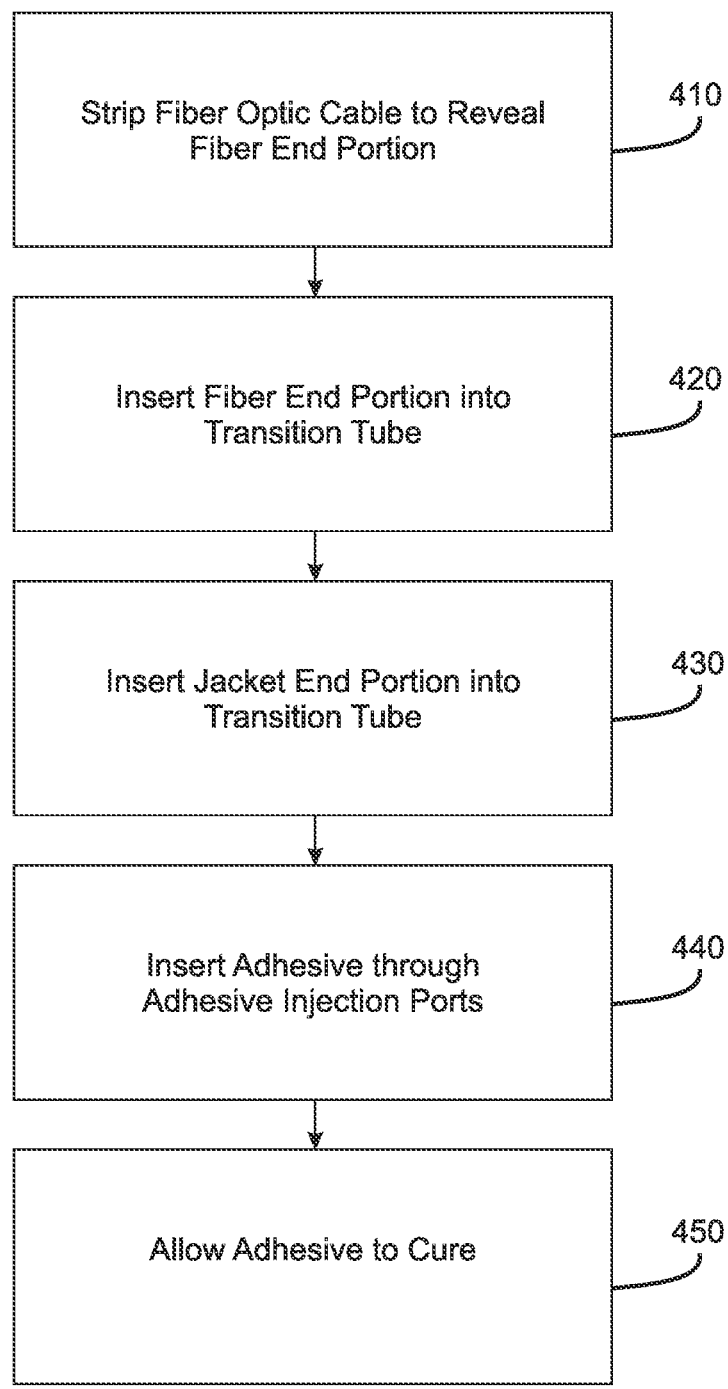
FIG. 16 is a flowchart depicting an example method of assembling an example fiber optic cable assembly.

FIG. 16 shows an example method 400 of processing the fiber optic cable assembly. The method 400 of FIG. 16 comprises a stripping fiber optic cable step 410, a fiber end insertion step 420, a jacket end insertion step 430, an adhesive introduction step 440, and an adhesive cure step 450.

The stripping fiber optic cable step 410 is described in detail above with reference to FIGS. 3 and 4. The stripping fiber optic cable step first requires a user to peel the cable jacket 124 of the fiber optic cable 120 along the notches 132 away from the optical fiber 122. Then, the peeled sections of the cable jacket 124 are cut away so that an optical fiber end portion 134 is shown protruding from a clean jacket end portion 136 of the fiber optic cable 120.

Figure 17:
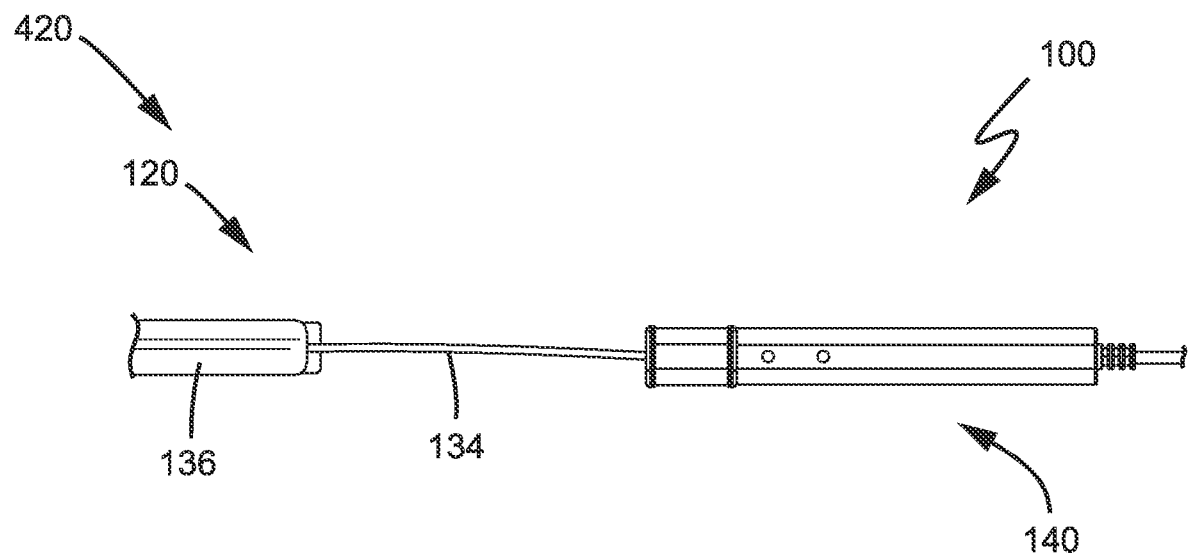
FIG. 17 is a side view of the fiber end insertion step of the example method of assembly of FIG. 16.

FIG. 17 depicts the fiber end insertion 420 step. Once an acceptable length of the optical fiber 122 is exposed, and the cable jacket 124 is cut away, an exposed portion of the optical fiber 122 protrudes from the jacket end portion 136 of the fiber optic cable 120. The fiber end portion 134 is then inserted into the first opening 160 of the transition tube 140 and routed through the first section passage 164, the second section passage 166, and out of the transition tube 140 through the second opening 162. In some cases, the passage 158 configuration displayed in the example of FIG. 15 aids in routing the fiber end portion 134 from the first section passage 164 into the second section passage 166, as the gradual decrease in the cross sectional area of the first section passage 164 acts as a funnel, guiding the end of the optical fiber 122 into the second section passage 166.

Figure 18:
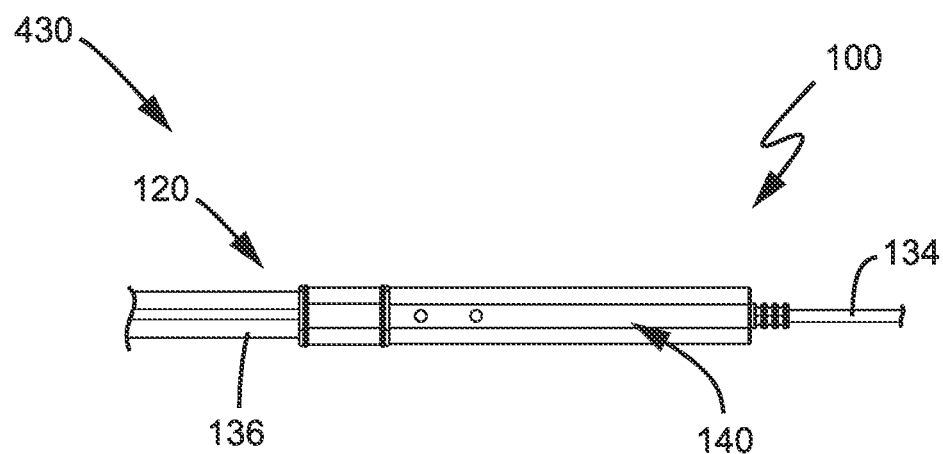
FIG. 18 is a side view of the jacket end insertion step of the example method of assembly of FIG. 16.

FIG. 18 is an example illustration of the jacket end insertion step 430. As depicted in in this example, after the fiber end portion 134 is routed through the transition tube 140 passage 158, the jacket end portion 136 is routed into the first opening 160 of the transition tube 140 behind the fiber end portion 134. The jacket end portion 136 is then fed into at least a portion of the length of the first section passage 164 of the transition tube 140. In some embodiments, the jacket end portion 136 is routed into the first section passage 164 so that the jacket end portion 136 is in contact with the first section passage end 168. In other embodiments, as illustrated in FIG. 9, the jacket end portion 136 is routed only partially into the first section passage 164 so that only part of the jacket end portion 136 is inserted through the first opening 160 into the first section passage 164. Thus, there remains a space between jacket end portion 136 and the first section passage end 168. The interior space between the jacket end portion 136 and the first section passage end 168 remains accessible from the exterior of the transition tube 140 by the adhesive injection ports 170.

Figure 19:
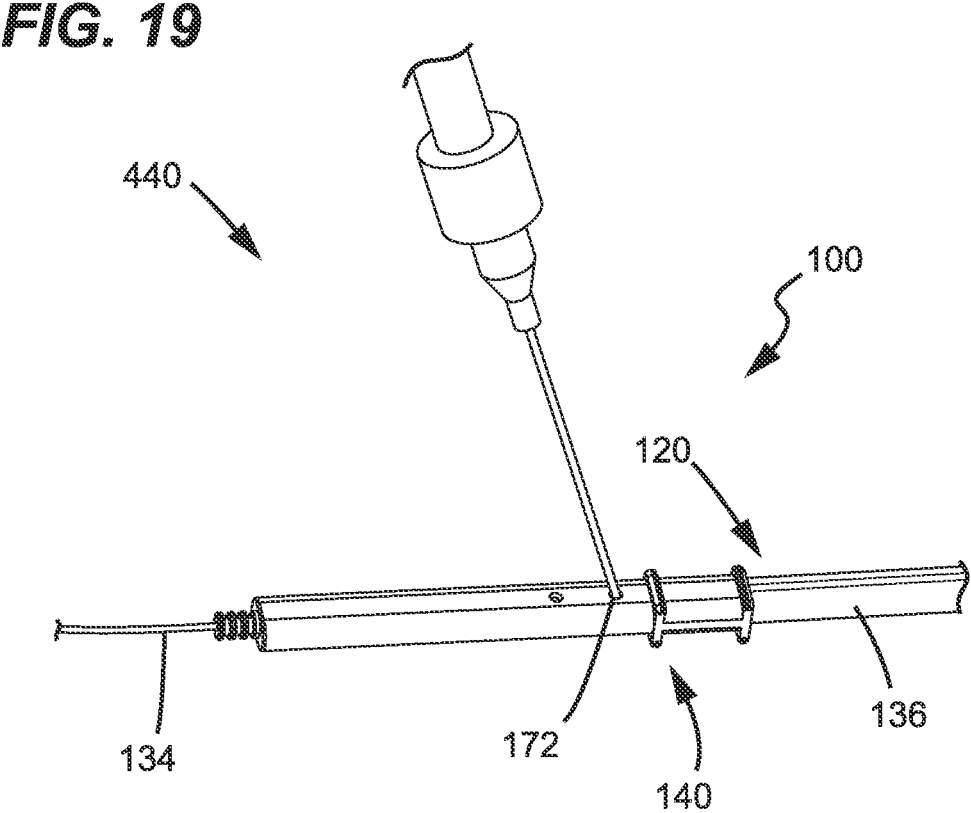
FIG. 19 is a perspective view of the sealant insertion step of the example method of assembly of FIG. 16.

FIG. 19 depicts the adhesive introduction step 440. In some embodiments, the space between the cut portion of the jacket and the first section passage end 168 is filled with a volume of cable adhesive 172. In FIG. 19, adhesive 172 is injected into the space via an adhesive dispensing needle through the adhesive injection port 170. Thus, the space is at least partially filled with adhesive 172. In some embodiments, the adhesive 172 is a moisture impermeable clear epoxy that fills voids within the passage 158 between the cable jacket and the interior surface of the transition tube 140 such that the cable jacket is effectively sealed within a package defined by the transition tube 140.

Figure 20:
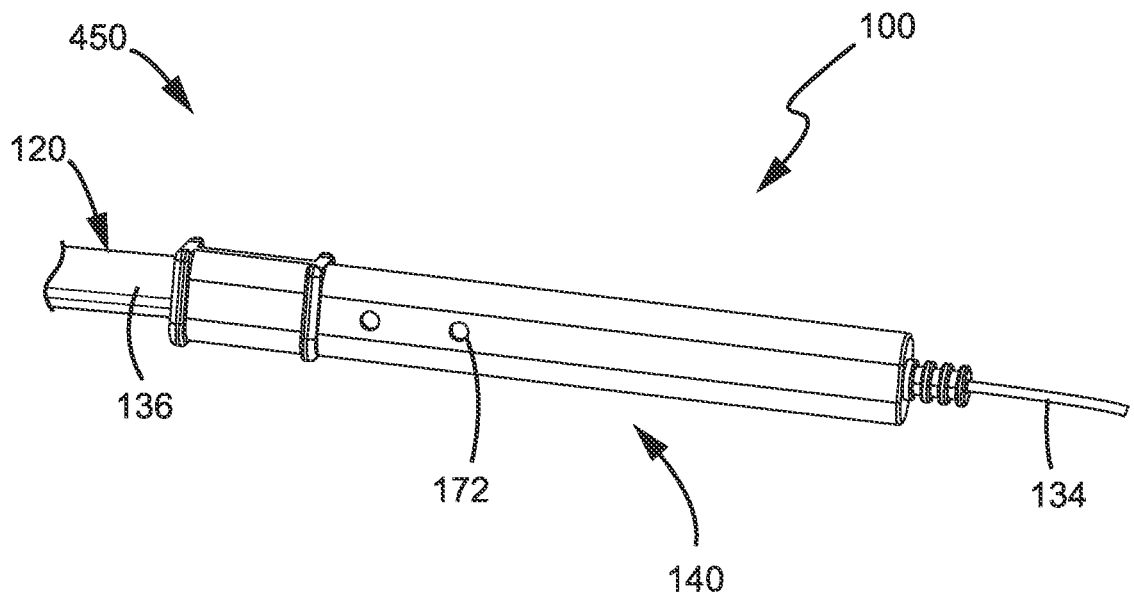
FIG. 20 is a side view of an example completed fiber optic cable assembly after completion of the sealant cure step of the example method of assembly of FIG. 16.

FIG. 20 depicts the adhesive cure step 450. After the adhesive 172 is injected into the first section passage 164, the adhesive is allowed to cure. In some embodiments, the adhesive is a curable adhesive such as epoxy that cures via time, temperature or via the application of energy such as ultraviolet radiation. FIG. 20 depicts an example fully assembled and cured fiber optic cable assembly 100. In the example of FIG. 20, the adhesive 172 is fully cured and creates a moisture impermeable bond between the fiber optic cable 120 and the transition tube 140 such that the end of the cable is sealed within the transition tube. The adhesive 172 also provides structural support so that the transition tube 140 remains firmly affixed around the fiber optic cable 120 even in response to axial pull loading applied to the fiber optic cable 120.

Figure 21:
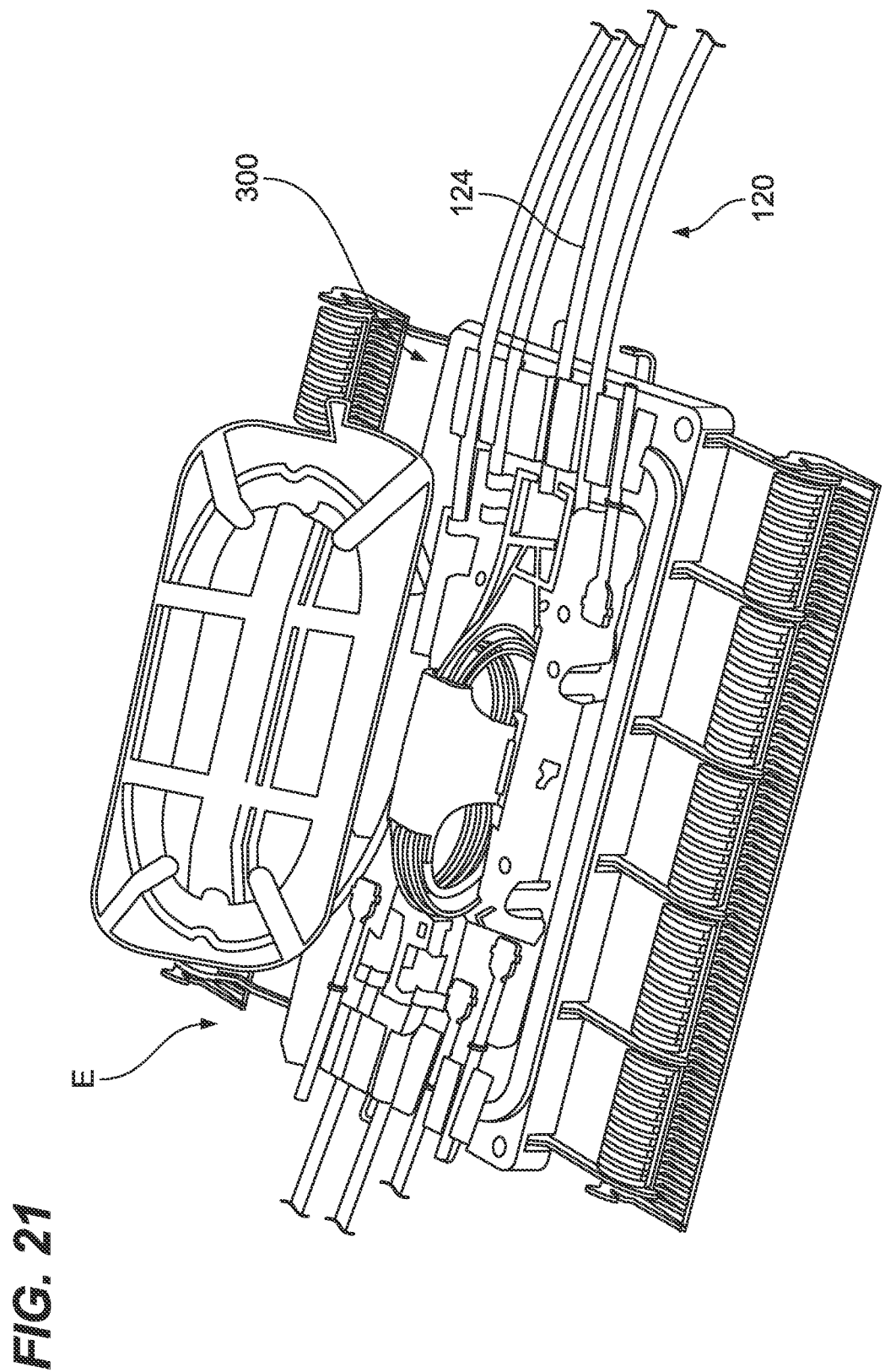
FIG. 21 is a perspective view of an example optical fiber enclosure and gel block seal.

FIG. 21 depicts a plurality of fiber optic cables routed into a fiber optic cable enclosure E. The fiber optic cable enclosure is used to house fiber optic components (e.g., optical splices, passive optical splitters, fiber optic adapters, fiber optic connectors) to protect them from harmful environmental conditions. In some embodiments, to provide an effective seal between the interior and exterior of the enclosure E, the enclosure E further includes a gel block seal 300 that wraps around and contacts a portion of the length of a cable jacket 124 of a fiber optic cable. The gel block seal 300 is made, for example, from a gel such as a thermoplastic elastomer (e.g., a styrenic block co-polymer) or a silicone gel that seals against the sides of the cable jacket 124 and prevents moisture or other contaminants from entering the interior of the enclosure E through the gel block seal 300.

Depending on the type of cable jacket 124 used with the gel block seal 300, imperfections in the sealing mechanism may arise. For example, certain cable jacket 124 materials, such as a low smoke zero halogen cable jacket, may chemically react with the gel block seal 300. This may cause the cable jacket 124 to degrade and, in some cases, leave the optical fiber 122 exposed and vulnerable to harmful environmental conditions. The chemical reaction could also cause degradation in the gel block seal 300 so that moisture and contaminants are able to enter the interior of the enclosure E and cause damage to the fiber optic components housed within it.

Similarly, the geometry of the cable jacket 124 can also contribute to imperfections in the sealing mechanism of the gel block seal 300. As previously noted, sharp terminations in the notches 132 of the cable jacket 124 facilitate easy peeling of the jacket by a user. However, when used in conjunction with the gel block seal 300, the gel is often unable to permeate throughout the entirety of the notch 132 and fails to contact the most interior portions of the sharp terminations of the notches 132. Thus, the gel block seal 300 fails to make a complete seal and moisture or contaminants may follow the uncontacted terminations of the notches 132 into the interior of the enclosure E.

Thus, in certain cases, the fiber optic cable 120 may be incompatible with a gel block seal 300 due to the material degradation or the geometry of the cable jacket 124. In these cases, the fiber optic cable assembly 100 of the present invention can be used within the gel block seal 300. Rather than placing the fiber optic cable 120 directly within the gel block seal 300 so that the cable jacket 124 contacts the gel block seal 300, the transition tube 140 of the fiber optic cable assembly 100 is placed in contact with the gel block seal 300. In doing so, the fiber optic cable assembly 100 is oriented so that fiber optic cable 120 is routed out of the gel block seal 300 outside of the enclosure E while the optical fiber 122 is routed out of the gel block seal 300 into the enclosure E. In some embodiments, using the transition tube 140 to contact the gel block seal 300 prevents the material degradation or incompatible geometry issues associated with contacting the gel block seal 300 directly with the cable jacket 124. By selecting the transition tube 140 material so that it does not react with the gel block seal 300, a user can minimize material degradation at the block seal 300 interface. Likewise, in some examples, the lack of irregular features extending longitudinally along the length of the transition tube 140 may minimize the amount of moisture or contaminants that may enter the enclosure E through the transition tube 140-block seal 300 interface.

Figure 22:
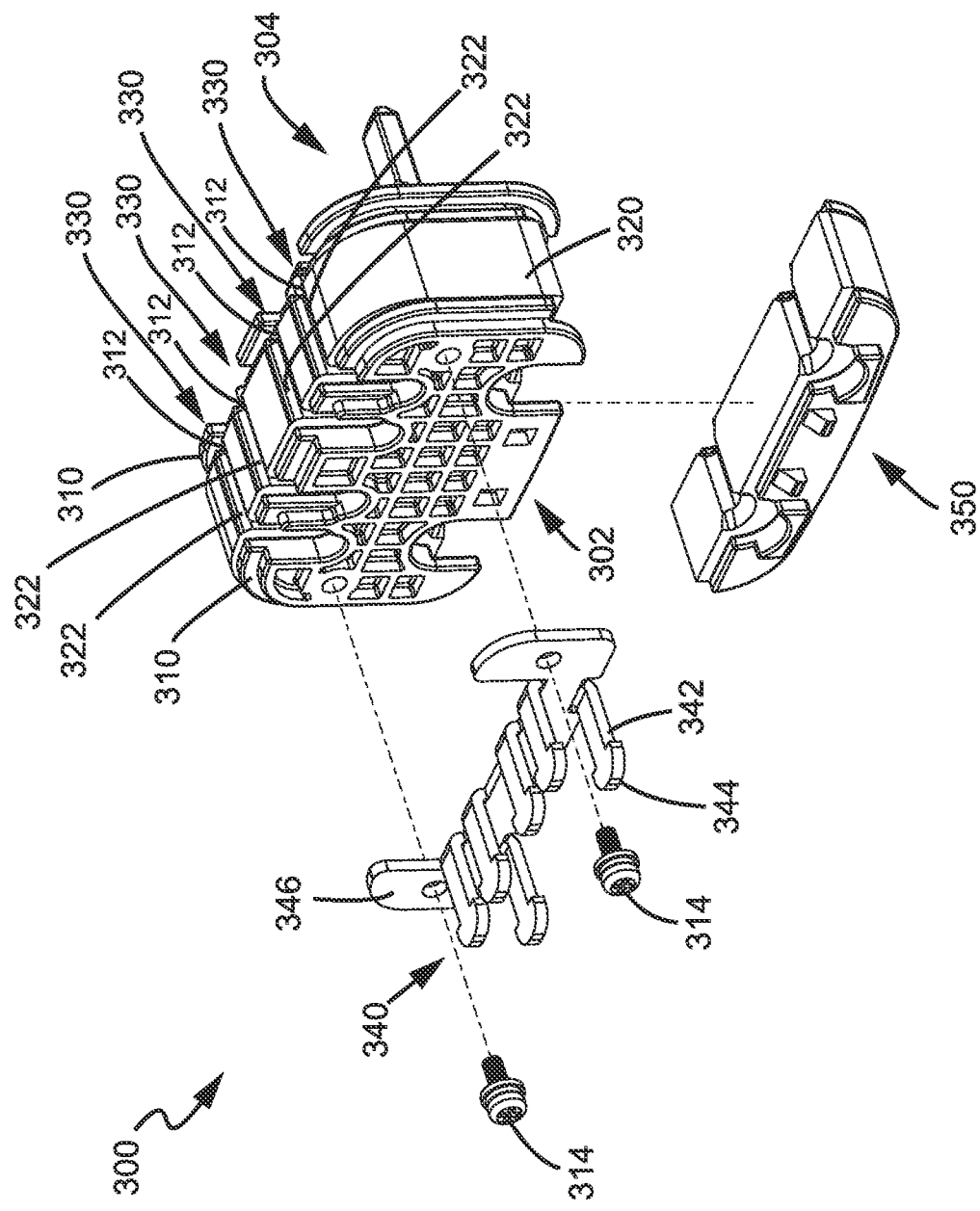
FIG. 22 is a perspective view of an example gel block seal, configured for use with the transition tube of the present invention.

FIG. 22 illustrates an example gel block seal 300 with a front side 302 and a back side 304 that can be used in conjunction with the fiber optic cable assembly of the present invention. In the example of FIG. 22, the gel block seal 300 includes a frame 310, a gel block 320, and retention pins 340. In some embodiments, the gel block seal 300 may also include a removeable segment 350 for allowing cables transition tubes to be loaded laterally into the gel block.

The frame 310 rigidly supports the components of the gel block seal 300 and holds the gel block seal 300 in place within the enclosure E. The frame 310 is made, for example, from a molded plastic material and is connected to the enclosure E with mating features located on the frame 310 or enclosure E. The frame 310 includes one or more cutouts 312 configured to receive a cable or other elongate components such as transition tubes. The number of cutouts 312 varies based on the type of gel block seal 300, but may be, for example, four, eight, or twelve. The cutouts 312 are configured, for example, to be U-shaped, so that a transition tube 140 body can be placed through the open end at the top of the cutout 312 and supported by the bottom and sidewalls of the cutout 312.

The gel block 320 is positioned in the middle of the gel block seal 300 so that it contacts the transition tube 140 as it is placed within the gel block seal 300. In some examples, the gel block 320 includes a series of slits 322 that correspond to the number of cutouts 312 in the frame 310 of the gel block seal 300. The gel block 320 is placed within the frame 310 so that the slits 322 line up with the cutout 312. The slit 322 and cutout 312 combination of the frame 310 and gel block 320 together form an inlet port 330 of the gel block seal 300. In this way, transition tube 140 can be placed within an inlet port 330 of the gel block seal 300 so that it is supported by the cutout 312 of the frame 310 and is routed through the slit 322 of the gel block 320. The gel block 320 is configured to wrap around the circumference of a portion of a length of transition tube 140 within the gel block seal 300. In some examples, the gel block 320 forms a moisture resistant seal around the outer cross-sectional profile of a length of transition tube 140 to prevent moisture from passing through the gel block 320 into the interior of an enclosure E.

In some embodiments, the gel block seal 300 further includes a cable anchoring frame 346 secured to the frame 310 by fasteners 314. The cable anchoring frame 346 includes a series of cable anchoring members 340. The anchoring members 340 are affixed to the frame 310 of the gel block seal 300 so that they are positioned in line with the inlet ports 330. The anchoring members 340 are oriented on the frame 310 so that they protrude out from a front side 302 of the gel block seal 300, in a direction parallel to the length of a transition tube 140 positioned within an inlet port 330 of the gel block seal 300. In some embodiments, the anchoring members 340 include an elongate body 342 and a head 344. The head 344 of each anchoring members 340 is configured to be wider than the elongate body 342. The anchoring members 340 may be affixed to the frame 310 of the gel block seal 300 individually. Alternatively, in some embodiments, as depicted by the example of FIG. 22, the anchoring members 340 consist of a single unit, with multiple anchoring members 340 all affixed to a single cable anchoring frame 346. Thus, the cable anchoring frame 346 is affixed to the frame 310 of the gel block seal 300, thereby securing all of the anchoring members 340 to a front face of the gel block seal frame 310. The cable anchoring frame 346 is affixed to the frame 310 of the gel block seal 300 using, for example, one or more fasteners 314. In some examples, the fasteners 314 are screws. Cables and/or transition tubes can be secured to the anchoring members 340 by fasteners such as cable ties, hose clamps, straps, or the like.

Figure 23:
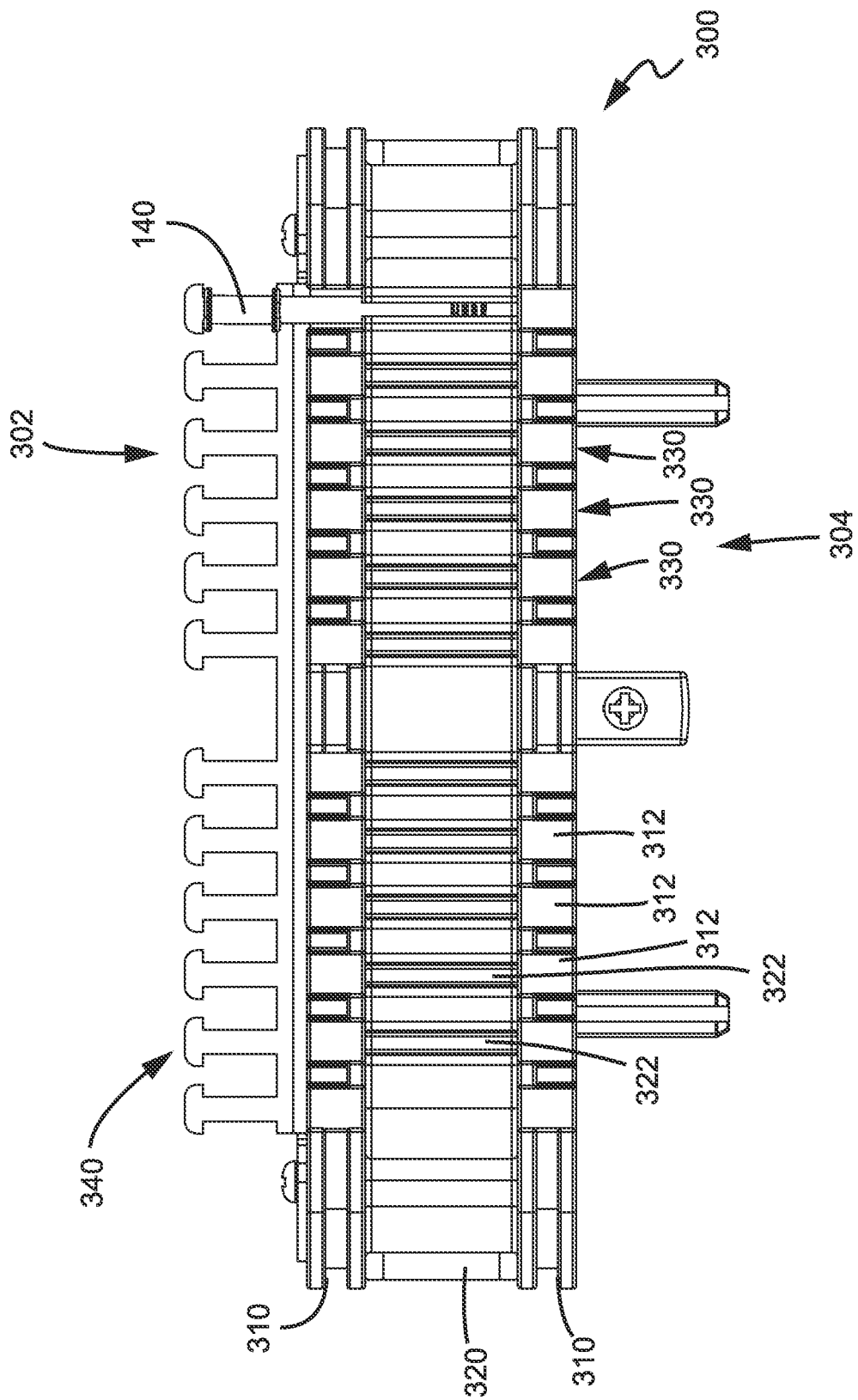
FIG. 23 is a top view of an example transition tube placed within an example gel block seal.
Figure 24:
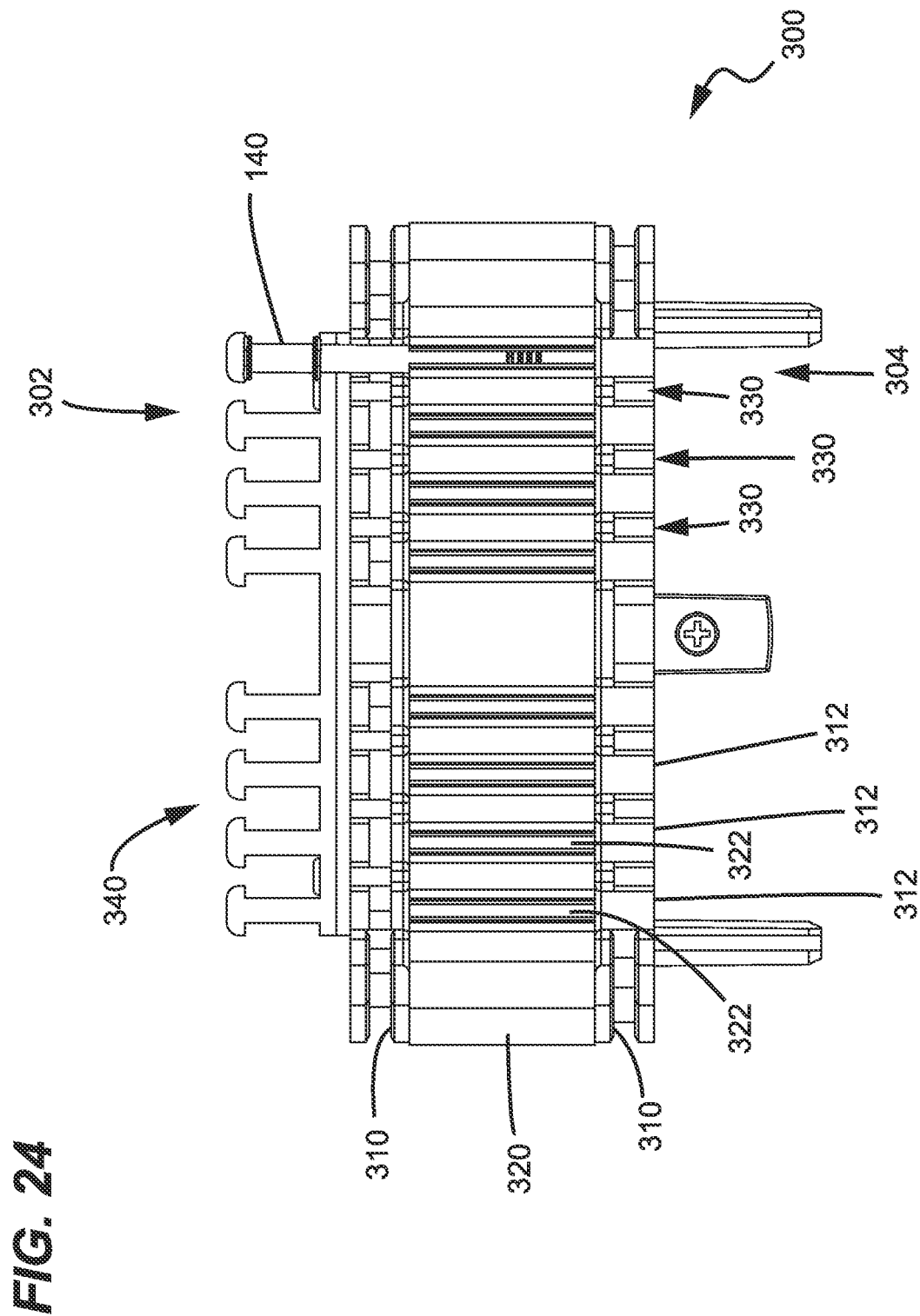
FIG. 24 is a top view of an example transition tube placed within another example gel block seal.
Figure 25:
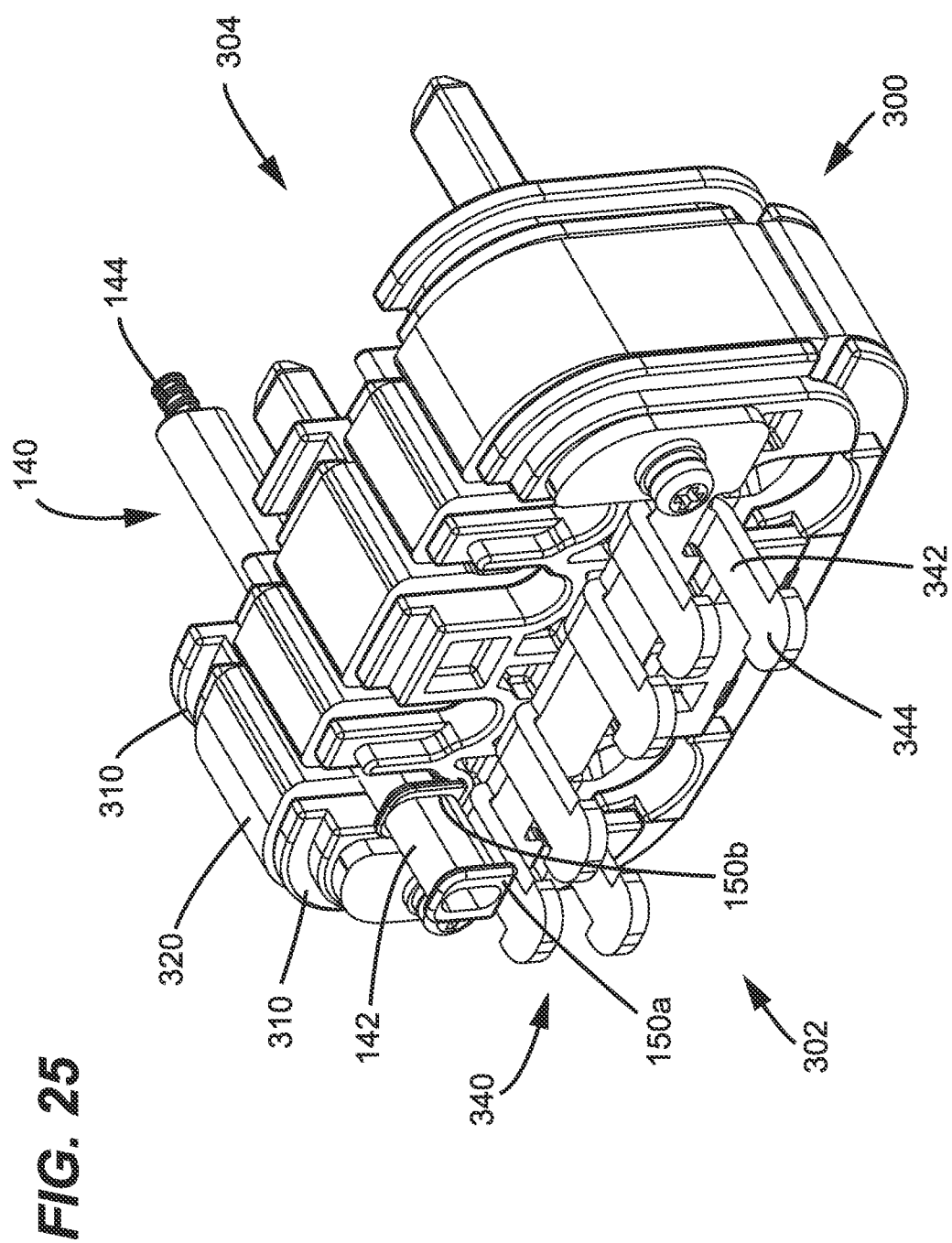
FIG. 25 is a perspective view of an example transition tube placed within another example gel block seal.
Figure 26:
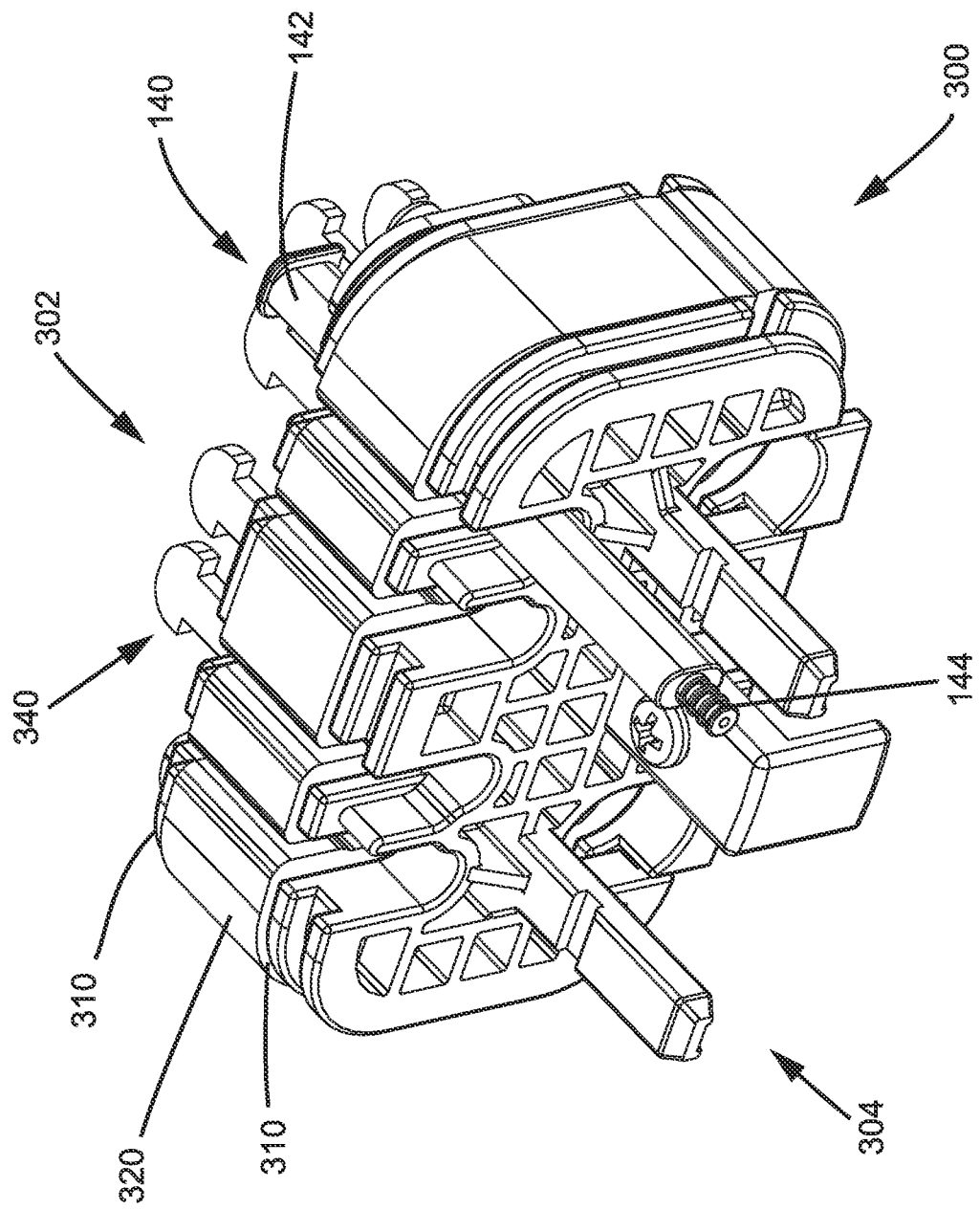
FIG. 26 is another perspective view of an example transition tube placed within the example gel block seal of FIG. 25.
Figure 27:
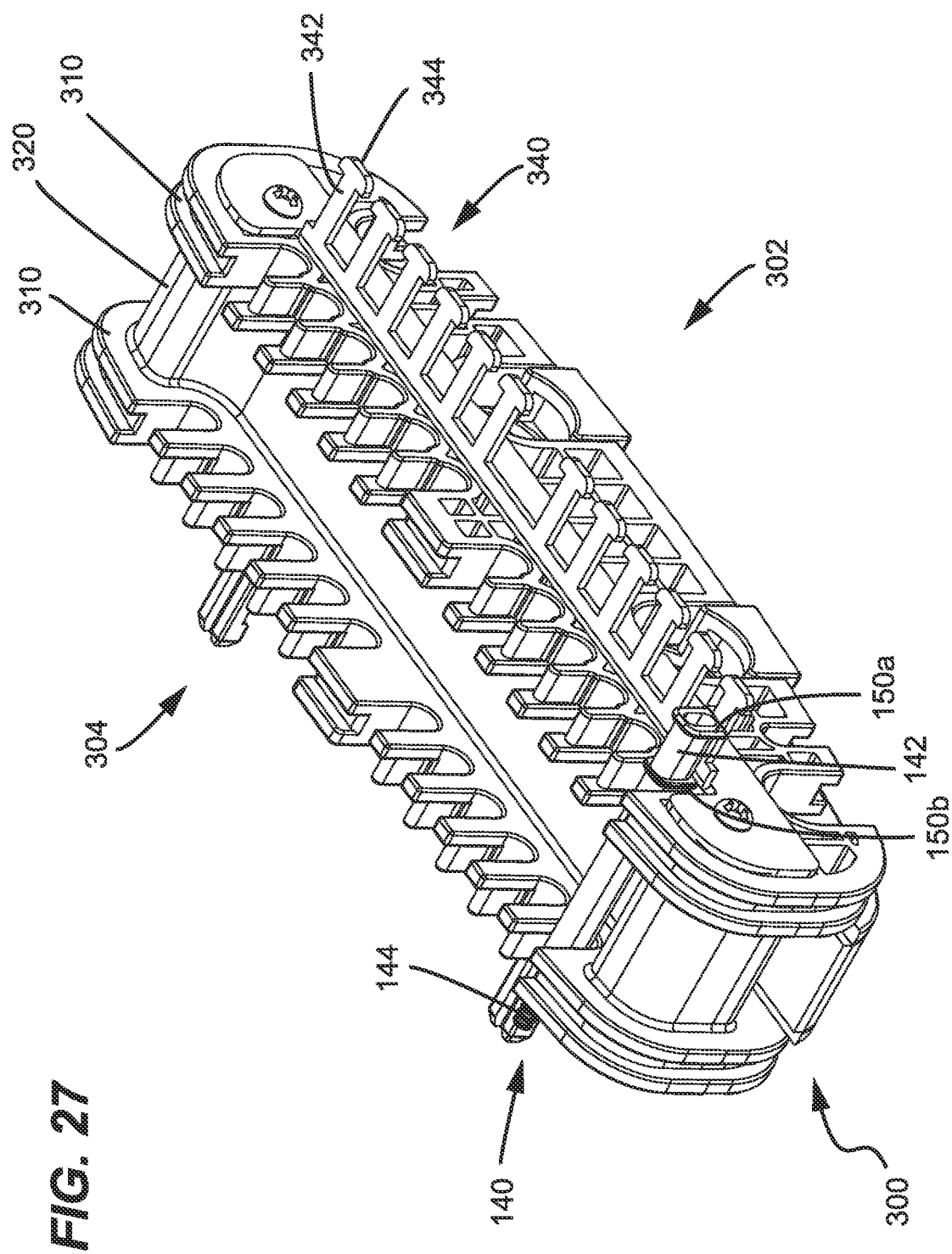
FIG. 27 is a perspective view of an example transition tube placed within another alternative example gel block seal.
Figure 28:
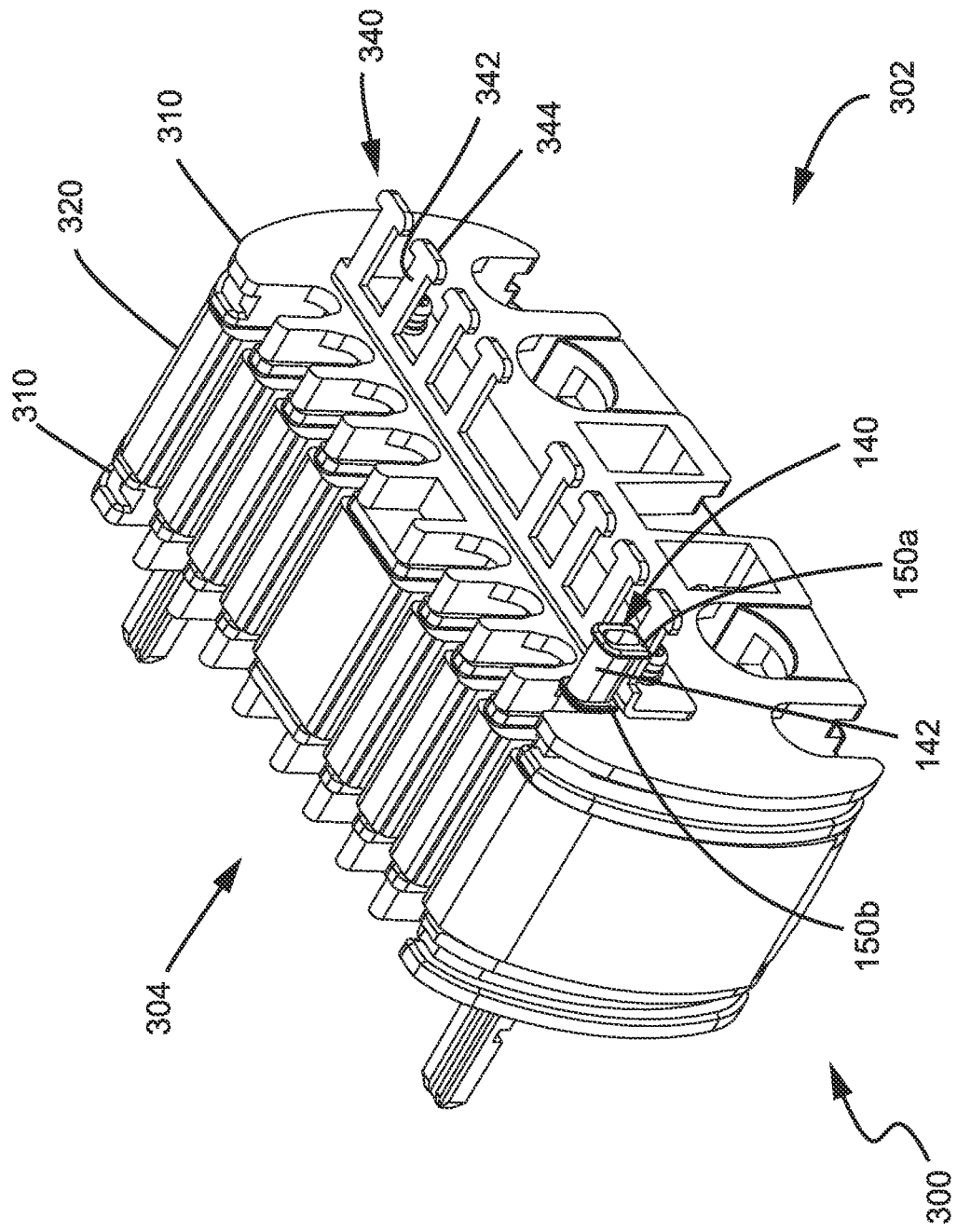
FIG. 28 is a perspective view of an example transition tube placed within another alternative example gel block seal.

When using the transition tube 140 in conjunction with the gel block seal 300, the transition tube 140 may extend partially or fully through the length of the gel block seal 300. For example, FIGS. 23 and 24 show an example placement of the transition tube 140 within a twelve and eight inlet port 330 gel block seal 300. In the examples of FIGS. 23 and 24, the transition tube 140 extends only partially through the inlet port 330 of the gel block seal 300 so that while a portion of the first section 146 protrudes out from the front side 302 of the gel block seal 300, the entire second section 148 is embedded within the gel block 320 of the gel block seal 300.

In other embodiments, as seen in FIGS. 25-28, the transition tube 140 is placed so that the transition tube 140 extends through the entire gel block seal 300. The first end 142 and second end 144 of the transition tube 140 extend from the front side 302 and back side 304 of the gel block seal 300 respectively. In the examples of FIGS. 25-28, the second section 148 of the transition tube 140 is positioned entirely outside of the gel block seal 300 while only the first section 146 contacts the gel block seal 300.

In the examples of FIGS. 23-28, the transition tube 140 is positioned within the gel block seal 300 so that it is parallel with the anchor members 340. Further, the space between the flanges 150 on the first section 146 of the transition tube 140 lines up with the elongate body 342 of the anchor members 340, located between the head 344 of the anchor members 340 and the frame 310 of the gel block seal 300. In this way, the first flange 150a of the transition tube 140 is positioned approximately the same distance from the from the front of the frame 310 of the gel block seal 300 as the head 344 of the anchor member 340. Likewise, the second flange 150b of the transition tube 140 is positioned approximately parallel with the front of the frame 310.

Figure 29:
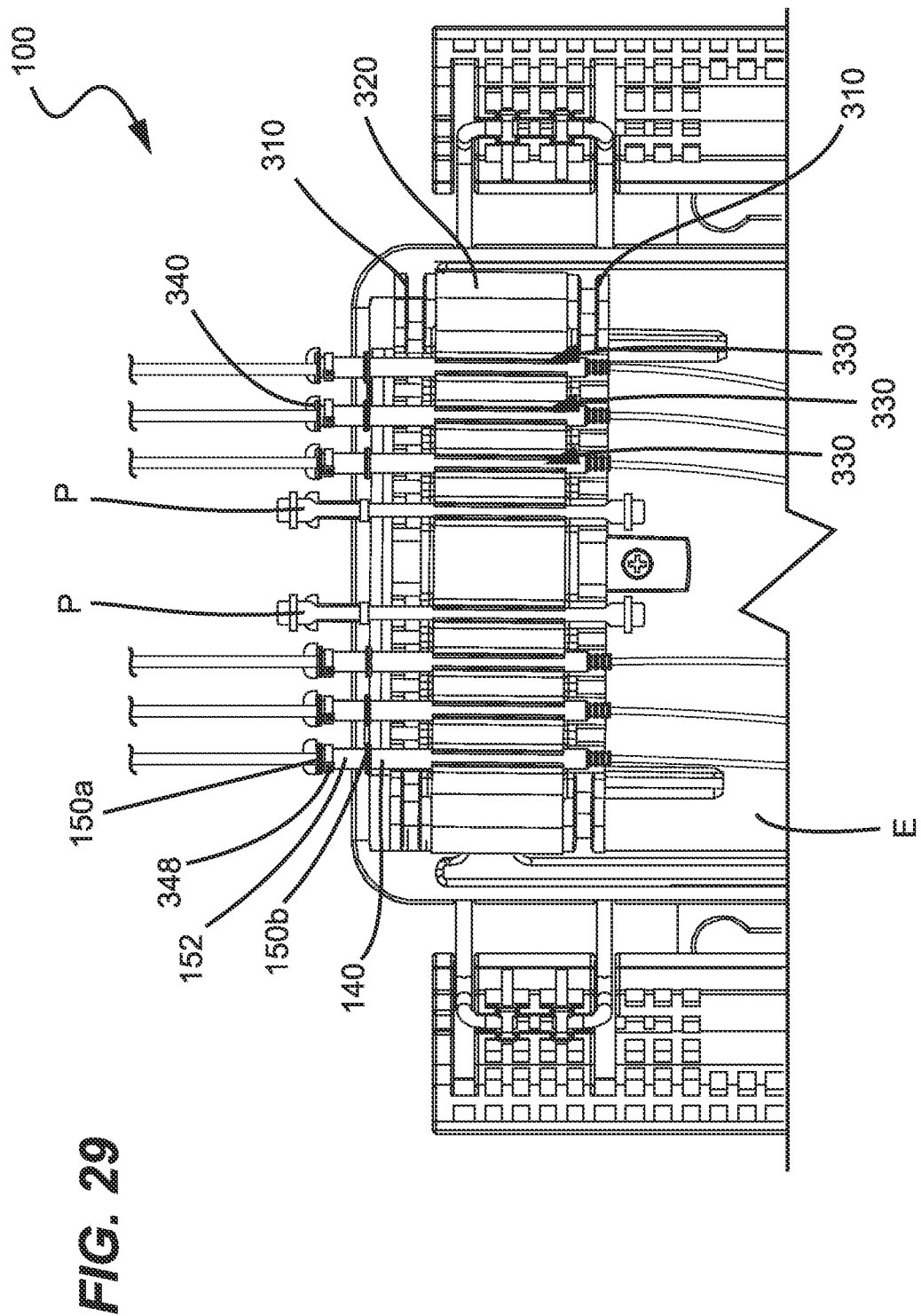
FIG. 29 is a top view of an example fiber optic cable assembly placed within an example gel block seal.
Figure 30:
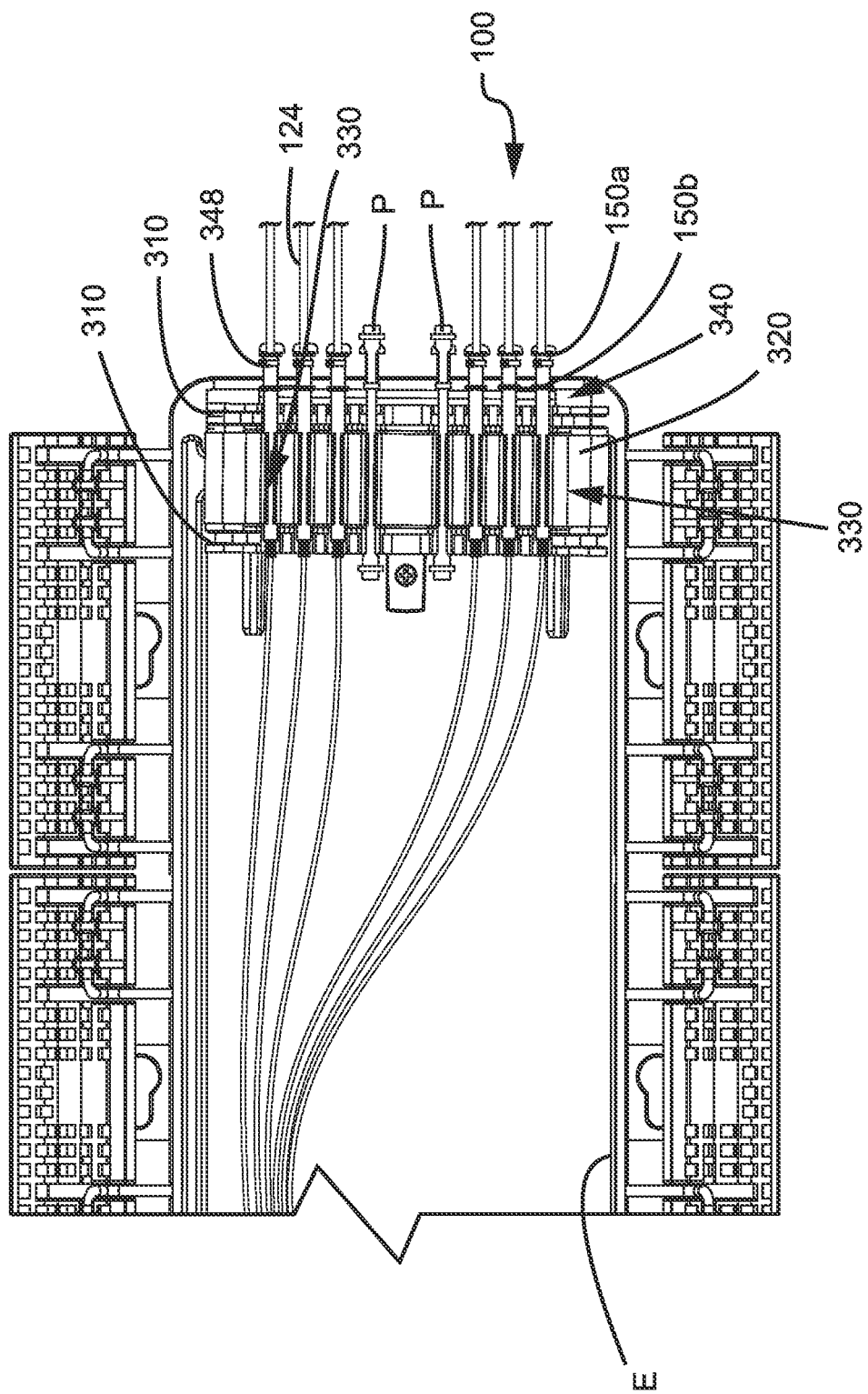
FIG. 30 is another top view of the example fiber optic cable assembly placed within the example gel block seal of FIG. 29.

In some embodiments, the transition tubes 140 can be secured to the anchor members 340. As depicted in the example embodiment in FIGS. 29 and 30, a fastener is used to wrap around the connecting space 152, between the first flange 150a and second flange 150b of the transition tube 140, and the elongate body 342 of the anchor member 340. The fastener is prevented from moving axially from this location by the first flange 150a and second flange 150b on the transition tube 140 and the head 344 of the anchor member 340 and frame 310 of the gel block seal 300. In some embodiments, the fastener is a plastic cable tie, however, the type of fastener may vary and could also be formed, for example, from a strip of Velcro or an elastic band. In some examples, use of the fastener to secure the transition tubes 140 to the anchor members 340 provides additional structural stability to the fiber optic cable assembly 100 and gel block seal 300 interface. For example, as depicted in FIG. 31, the fiber optic cable assembly 100 may be securely held in place within the gel block seal 300 by the fastener.

Turning back to FIGS. 29 and 30, multiple fiber optic cable assemblies 100 may be placed within the gel block seal 300, depending on the number of inlet ports 330 within the gel block seal 300. As seen in FIGS. 25-28, the number of inlet ports 330 in the gel block seal 300 may vary, for example, from four to twelve. In the case where fewer fiber optic cable assemblies 100 are placed within the gel block 320 than the number of inlet ports 330, a placeholder piece P such as a dummy plug can be inserted into the inlet port 330 of the gel block seal 300, as to prevent moisture and debris from entering the interior of the enclosure E through the unoccupied inlet of the gel block seal 300.

When placed within the inlet ports 330 of the gel block seal 300, the fiber optic cable assembly 100 is configured so that the fiber optic cable 120, protected by the cable jacket 124, is routed outside of the enclosure E and the exposed length of the optical fiber 122 is routed into the enclosure E. In this configuration, the optical fiber 122 and fiber optic components within the enclosure E are protected from damaging environmental conditions. For example, the optical fiber 122 is protected from moisture and debris outside of the enclosure E by the cable jacket 124 and from inside of the enclosure E by the sealed enclosure E walls. The enclosure E provides a moisture resistant seal by sealing around the frame 310 of the gel block seal 300. The gel block seal 300 provides a moisture resistant seal where the gel block 320 seals around the body of the transition tube 140. The transition tube 140 provides a moisture resistant seal between the transition tube 140 and the fiber optic cable through the cured adhesive 172 within its interior.

Figure 31:
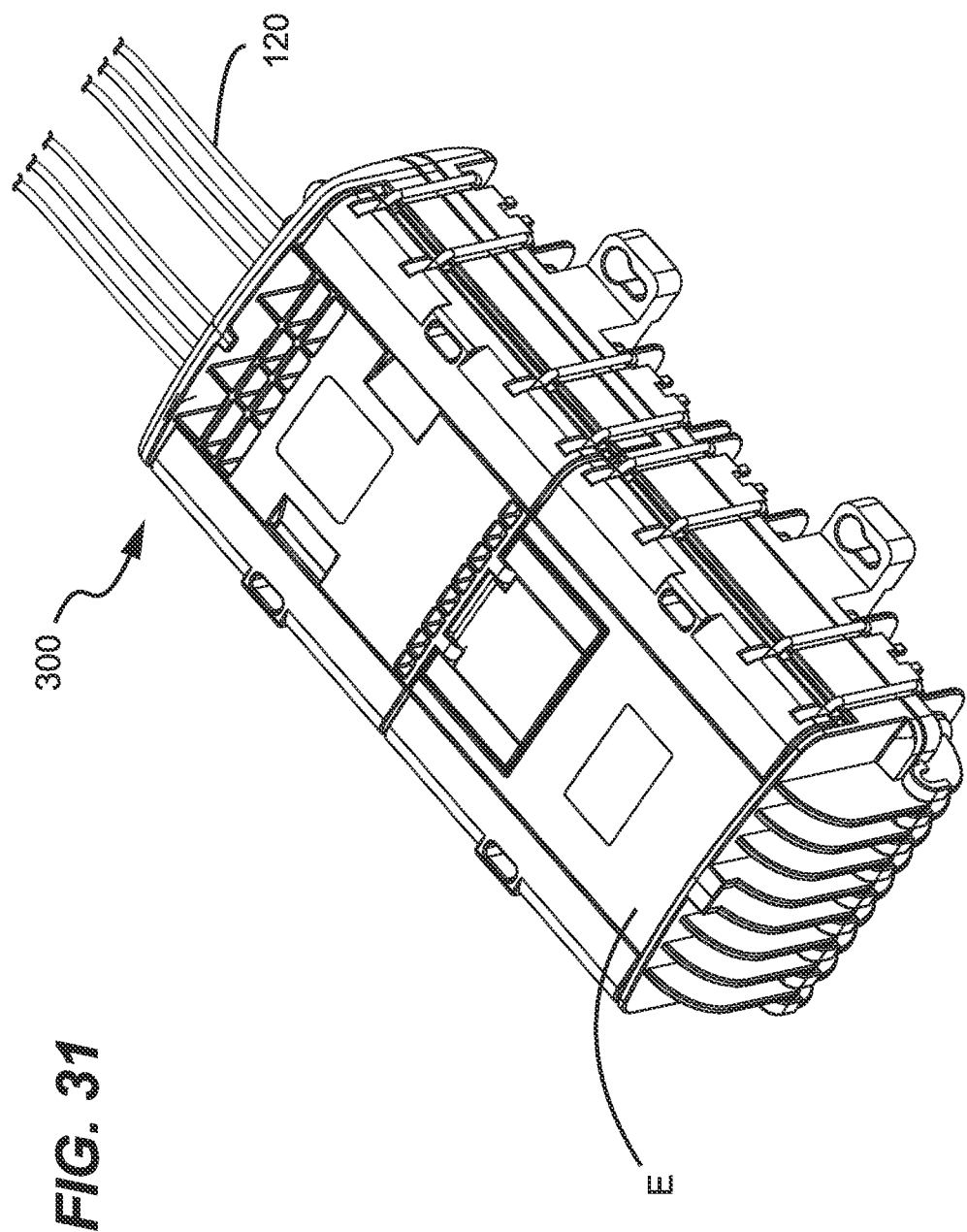
FIG. 31 is a perspective view of the example fiber optic cable assembly placed within the example gel block seal of FIG. 29.

FIG. 31 shows the sealed cable enclosure E with a plurality of fiber optic cable assemblies 100 secured within the gel block seal. In this state, the jacket end portions 136 of the fiber optic cable assemblies 100 are the only portion of the fiber optic cable assemblies 100 visible in the figure. When sealed, the cable enclosure and gel block seal can prevent moisture from entering the interior of the enclosure E and damaging moisture sensitive contents within. Using the cable assemblies 100 with the enclosure E, can allow for fiber optic signals to be transmitted to components within the enclosure E, all while the enclosure E protects the moisture sensitive contents from damaging external conditions.

Figure 32:
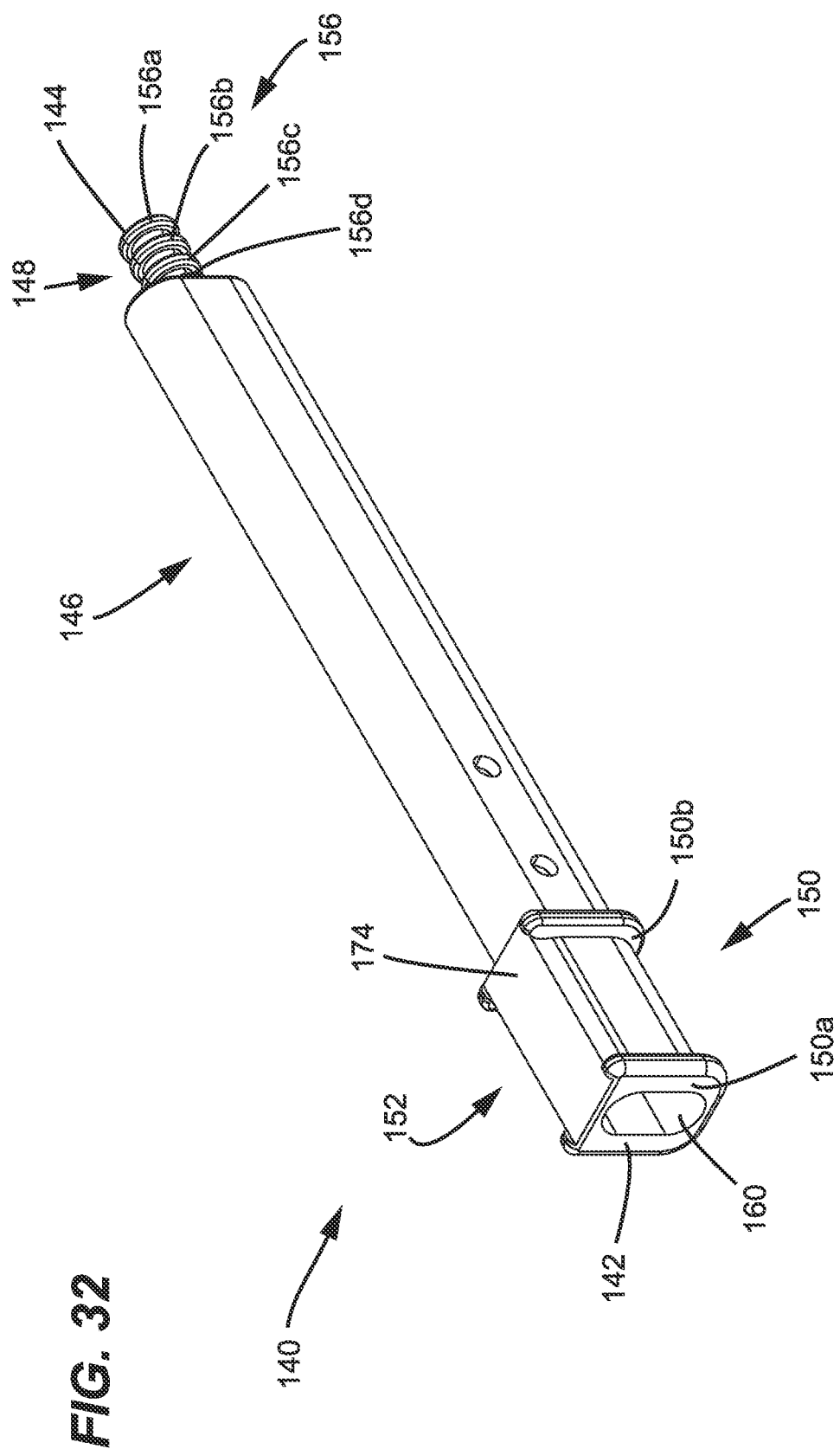
FIG. 32 is a perspective view of an additional embodiment of an example transition tube.

FIG. 32 shows a perspective view of an alternative embodiment of the transition tube 140. In some embodiments, as depicted in the alternative embodiment of FIG. 32, the transition tube 140 has connecting base 174 located somewhere on the connecting space 152. In some embodiments, the connecting base 174 extends all the way between the first flange 150a and the second flange 150b. The connecting base 174 may be located anywhere around the outer surface of the first section 146. In some embodiments, the connecting base 174 replaces the connecting flange 154, located on the top side of the transition tube 140.

Figure 33:
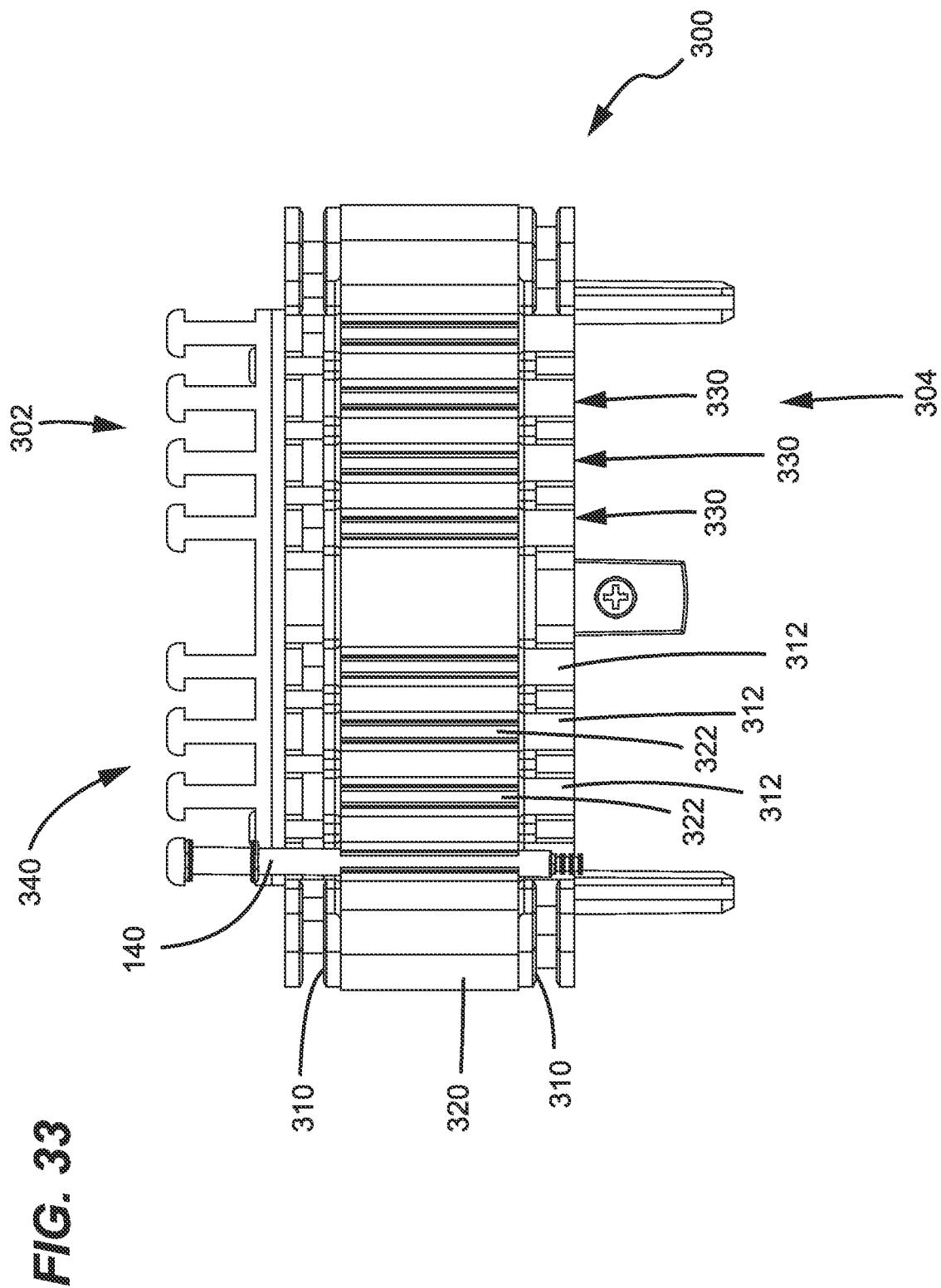
FIG. 33 is a top view of the example transition tube of FIG. 32 placed within an example gel block seal.

FIG. 33 depicts the alternative embodiment transition tube 140 of FIG. 32, when used in conjunction with the gel block seal 300. As discussed with reference to FIGS. 23 and 24, the transition tube 140 may extend partially or fully through the gel block seal 300. In the embodiment of FIG. 33, the transition tube 140 is positioned within the gel block seal 300 so that the connecting base 174 is oriented towards one of the anchor members 340 of the gel block seal 300. In some embodiments, when placed in this orientation, the connecting base 174 contacts the surface of the anchor member 340 when a fastener is used to wrap around the connecting space 152, between the first flange 150a and second flange 150b of the transition tube 140, and the elongate body 342 of the anchor member 340.

Figure 34:
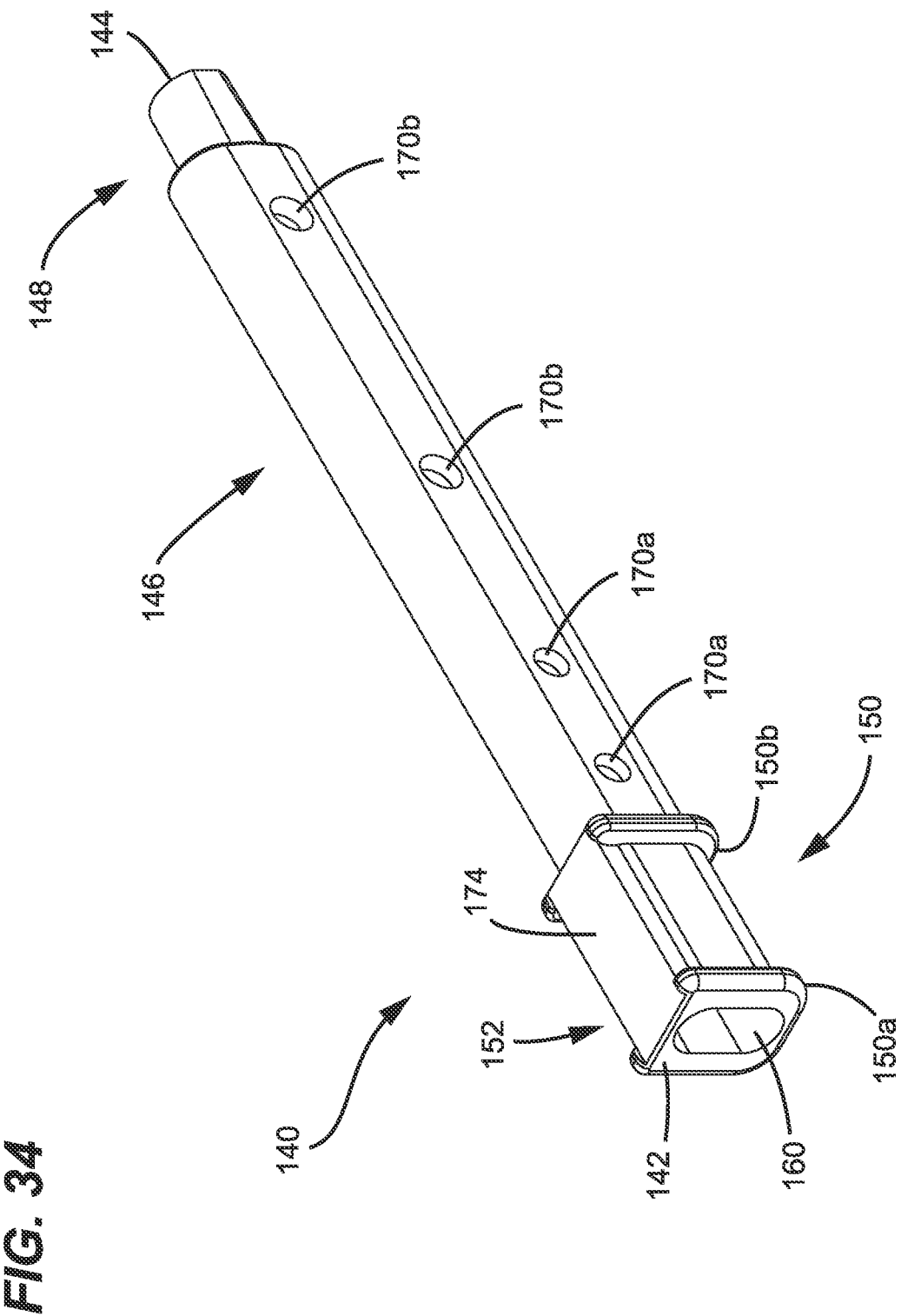
FIG. 34 is a perspective view of another alternative embodiment of an example transition tube.

FIG. 34 shows a perspective view of another alternative embodiment of the transition tube 140. In some embodiments, as depicted in the alternative embodiment of FIG. 34, the second section 148 of the transition tube 140 does not include any annular exterior ribs. Instead, the outer surface of the second section 148 is provided as a smooth surface. Additionally, in some embodiments, as depicted in the alternative embodiment of FIG. 34, the transition tube includes additional injection ports 170b. In some examples, the additional injection ports 170b are the same size as the adhesive injection ports 170a, while in other examples, the additional injection ports 170b are sized differently from the adhesive injection ports 170a. In some examples, the additional injection ports 170b are also used as ports for injecting adhesive.

The present inventive concepts have been described above with reference to the accompanying drawings. The present inventive concepts are not limited to the illustrated embodiments. Rather, these embodiments are intended to fully and completely disclose the present inventive concepts to those skilled in this art. In the drawings, like numbers refer to like elements throughout. Thicknesses and dimensions of some components may be exaggerated for clarity.

Spatially relative terms, such as "under," "below," "lower," "over," "upper," "top," "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the example term "under" can encompass both an orientation of over and under. The device may be otherwise oriented (rotated 90 degrees or at other orientations) and the spatially relative descriptors used herein interpreted accordingly.

Herein, the terms "attached," "connected," "interconnected," "contacting," "mounted,"and the like can mean either direct or indirect attachment or contact between elements, unless stated otherwise.

Well-known functions or constructions may not be described in detail or brevity and/or clarity. As used herein the expression "and/or" includes any and all combinations of one or more of the associated listed items.

The terminology used herein is for the purpose of describing particular embodiments only and is not intended to be limiting of the present inventive concepts. As used herein, the singular forms "a," "an," and "the" are intended to include the plural forms as well, unless the context clearly indicates otherwise. It will be further understood that the terms "comprises," "comprising," "includes," and/or "including" when used in this specification, specify the presence of stated features, operations, elements, and/or components, but do not preclude the presence or addition of one or more other features, operations, elements, components, and/or groups thereof.

What is claimed is:

1. A fiber optic assembly comprising:
an enclosure defining a cable entrance/exit location at which a gel block is located;
a fiber optic cable including a cable jacket and at least one optical fiber protected by the cable jacket, the cable jacket including a jacket end portion and the optical fiber including a fiber end portion that projects beyond the jacket end portion; and
a transition tube having a length that extends between first and second ends of the transition tube, the transition tube defining a passage that extends through the length of the transition tube between the first and second ends of the transition tube, the cable jacket extending into the passage of the transition tube through the first end of the transition tube, the jacket end portion being adhesively bonded and sealed within the passage of the transition tube, and the fiber end portion exiting the transition tube at the second end of the transition tube, wherein the transition tube is adapted to extend at least partially through the gel block to route the optical fiber into the enclosure while preventing contact between the gel block and the cable jacket, and wherein the gel block is configured to seal about the transition tube.

2. The fiber optic assembly of claim 1, wherein the fiber optic cable further comprises a buffer layer that surrounds and protects the optical fiber, the buffer layer extending along the optical fiber within the cable jacket and also extending along the fiber end portion.

3. The fiber optic assembly of claim 2, wherein the buffer layer has an outer diameter in the range of 800-1000 microns.

4. The fiber optic assembly of claim 1, wherein a portion of the fiber end portion is positioned within the enclosure.

5. The fiber optic assembly of claim 4, wherein a portion of the jacket end portion is positioned outside of the enclosure.

6. The fiber optic assembly of claim 1, wherein the seal between the gel block and the transition tube prevents moisture from entering an interior of the enclosure.

7. A fiber optic cable assembly comprising:
- a fiber optic cable including a cable jacket and at least one optical fiber protected by the cable jacket, the cable jacket defining at least one access notch that extends along a length of the cable jacket for facilitating tearing the cable jacket to access the optical fiber, the cable jacket including a jacket end portion and the optical fiber including a fiber end portion that projects beyond the jacket end portion;
- a transition tube having a length that extends between first and second ends of the transition tube, the transition tube defining a passage that extends through the length of the transition tube between the first and second ends of the transition tube; and
- the cable jacket extending into the passage of the transition tube through the first end of the transition tube, the jacket end portion being adhesively bonded and sealed within the passage of the transition tube, and the fiber end portion exiting the transition tube at the second end of the transition tube, wherein the transition tube includes a first section adjacent the first end of the transition tube and a second section adjacent the second end of the transition tube, wherein the passage of the transition tube has a cross-sectional area, wherein the cross-sectional area of the passage is larger in the first section of the transition tube than in the second section of the transition tube, wherein the jacket end portion is received within the first section of the transition tube, wherein a gradual size transition is provided within the passage between the first section and the second section, wherein the gradual size transition has transition surfaces that are angled relative to one another such that the transition surfaces gradually converge as the transition surfaces extend toward the second end of the transition tube, wherein the transition surfaces form a funnel for guiding the fiber end portion from the first section of the transition tube to the second section of the transition tube during insertion of the fiber optic cable into the transition tube, and wherein the transition tube includes outer flanges that extend around the exterior of the first section of the transition tube adjacent the first end of the transition tube, the flanges including first and second flanges separated by a gap adapted for receiving a cable tie.

8. The fiber optic cable assembly of claim 7, wherein the cable jacket has an elongate transverse cross-sectional profile, wherein the first section of the transition tube includes an elongate outer transverse cross-sectional profile, and wherein the passage of the transition tube has an elongate transverse cross-sectional profile along the first section of the transition tube.

9. The fiber optic cable assembly of claim 8, wherein the passage has a round transverse cross-section within the second section.

10. The fiber optic cable assembly of claim 9, wherein an outer transverse cross-sectional profile of the second section of the transition tube is round, and wherein annular exterior ribs are provided on the exterior of the transition tube at the second section.

* * * * *